(12) United States Patent
Fritz et al.

(10) Patent No.: US 12,463,285 B2
(45) Date of Patent: *Nov. 4, 2025

(54) CELL CONTACTING SYSTEM FOR AN ELECTROCHEMICAL DEVICE

(71) Applicant: ElringKlinger AG, Dettingen (DE)

(72) Inventors: Wolfgang Fritz, Metzingen (DE); Stefan Kazmaier, Kirchheim unter Teck (DE)

(73) Assignee: ElringKlinger AG, Dettingen (DE)

( * ) Notice: Subject to any disclaimer, the term of this patent is extended or adjusted under 35 U.S.C. 154(b) by 327 days.

This patent is subject to a terminal disclaimer.

(21) Appl. No.: 18/153,821

(22) Filed: Jan. 12, 2023

(65) Prior Publication Data
US 2023/0207950 A1    Jun. 29, 2023

Related U.S. Application Data

(63) Continuation of application No. 16/404,410, filed on May 6, 2019, now Pat. No. 11,588,197, which is a
(Continued)

(51) Int. Cl.
*H01M 50/30*    (2021.01)
*H01M 50/20*    (2021.01)
(Continued)

(52) U.S. Cl.
CPC ........... *H01M 50/30* (2021.01); *H01M 50/20* (2021.01); *H01M 50/209* (2021.01);
(Continued)

(58) Field of Classification Search
CPC .... H01M 50/20; H01M 50/30; H01M 50/502; H01M 50/543; H01M 2220/20;
(Continued)

(56) References Cited

U.S. PATENT DOCUMENTS 8,574,008 B2    11/2013    Grobe et al.
8,632,905 B2    1/2014     Yasui et al.
(Continued)

FOREIGN PATENT DOCUMENTS

CN           101621045          1/2010
DE       10 2011 109 238       2/2013
(Continued)

*Primary Examiner* — Michael L Dignan
(74) *Attorney, Agent, or Firm* — Womble Bond Dickinson (US) LLP

(57) ABSTRACT

A cell contacting system for an electrochemical device is provided, which includes a plurality of cell groups having one or more electrochemical cells, each having a first and a second cell terminal. The first cell terminals follow each other along the longitudinal direction in a first cell terminal region of the electrochemical device and the second cell terminals follow each other along the longitudinal direction in a second cell terminal region of the electrochemical device. The cell contacting system includes at least one cell connector extending obliquely to the longitudinal direction and configured for electrically conductively connecting cell terminals of a first cell group in the first cell terminal region to cell terminals of a second cell group in the second cell terminal region, which cell contacting system reliably enables a relative movement between the cell terminals to be electrically connected to each other.

18 Claims, 21 Drawing Sheets

Related U.S. Application Data continuation of application No. PCT/EP2017/078345, filed on Nov. 6, 2017.

(51) Int. Cl.
  *H01M 50/209* (2021.01)
  *H01M 50/502* (2021.01)
  *H01M 50/503* (2021.01)
  *H01M 50/51* (2021.01)
  *H01M 50/522* (2021.01)
  *H01M 50/543* (2021.01)
  *H01M 50/55* (2021.01)
  *H01M 50/553* (2021.01)

(52) U.S. Cl.
  CPC ....... *H01M 50/502* (2021.01); *H01M 50/503* (2021.01); *H01M 50/51* (2021.01); *H01M 50/522* (2021.01); *H01M 50/543* (2021.01); *H01M 50/55* (2021.01); *H01M 50/553* (2021.01); *H01M 2220/20* (2013.01)

(58) Field of Classification Search
  CPC ............. H01M 50/209; H01M 50/249; H01M 50/503; H01M 50/509; H01M 50/553; Y02E 60/10
  See application file for complete search history.

(56) References Cited

U.S. PATENT DOCUMENTS

| | | | |
|---|---|---|---|
| 8,658,306 B2 | 2/2014 | Park et al. | |
| 8,822,052 B2 | 9/2014 | Yang et al. | |
| 9,343,724 B2 | 5/2016 | Groshert et al. | |
| 10,297,806 B2 | 5/2019 | Nakayama et al. | |
| 10,431,856 B2 | 10/2019 | Fritz | |
| 10,847,773 B2 | 11/2020 | Sim et al. | |
| 2008/0242139 A1 | 10/2008 | Matsuoka | |
| 2010/0266887 A1* | 10/2010 | Sekino | H01M 50/507 429/123 |
| 2011/0091763 A1* | 4/2011 | Park | H01M 50/204 429/158 |
| 2011/0151316 A1* | 6/2011 | Yoon | H01M 50/209 429/160 |
| 2013/0177790 A1 | 7/2013 | Yang et al. | |
| 2013/0189563 A1 | 7/2013 | Chang et al. | |
| 2014/0017553 A1 | 1/2014 | Kikuchi et al. | |
| 2014/0069690 A1* | 3/2014 | Diez | H01M 50/526 29/874 |
| 2015/0070025 A1 | 3/2015 | Nakayama et al. | |
| 2015/0162578 A1* | 6/2015 | Kim | H01M 50/507 429/82 |
| 2015/0214532 A1* | 7/2015 | Nakayama | H01M 50/509 429/50 |
| 2016/0043448 A1* | 2/2016 | Fritz | H01M 10/486 429/90 |
| 2016/0351883 A1* | 12/2016 | Lemke | H01M 10/482 |
| 2018/0097322 A1* | 4/2018 | Harris, III | H01M 50/505 |
| 2019/0198845 A1 | 6/2019 | Bae et al. | |

FOREIGN PATENT DOCUMENTS

| | | |
|---|---|---|
| EP | 2 824 732 | 1/2015 |
| JP | 2015-046354 | 3/2015 |

* cited by examiner

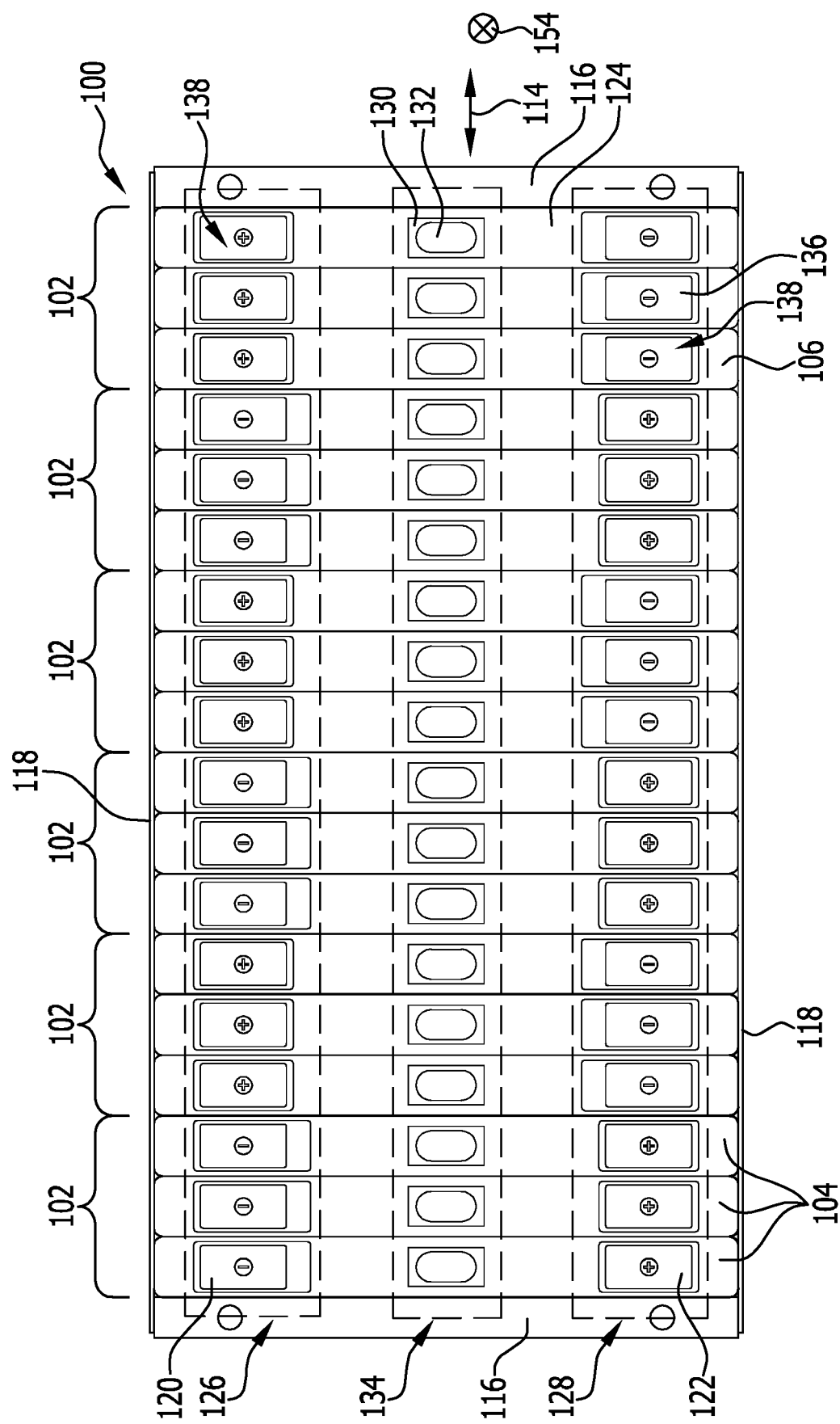

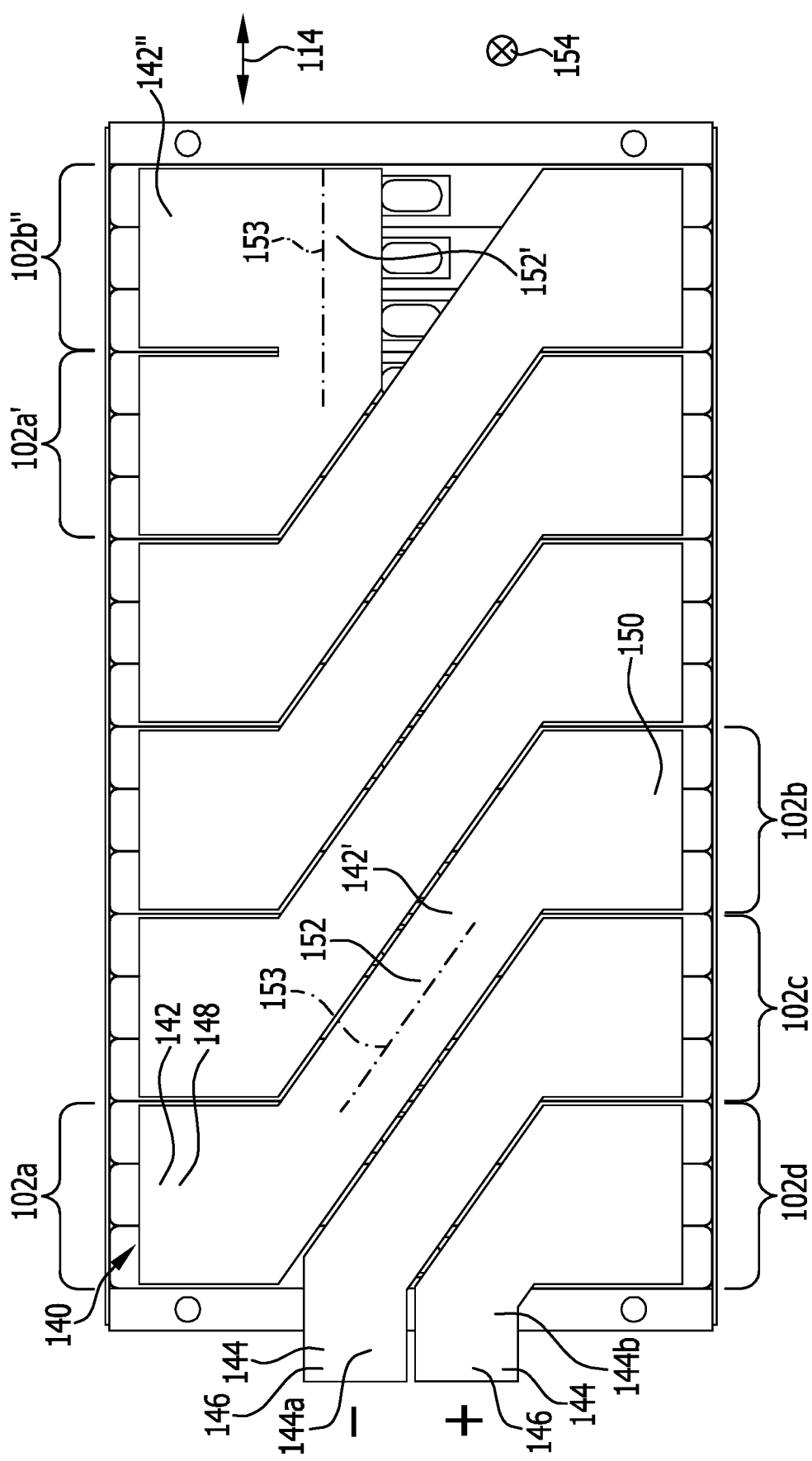

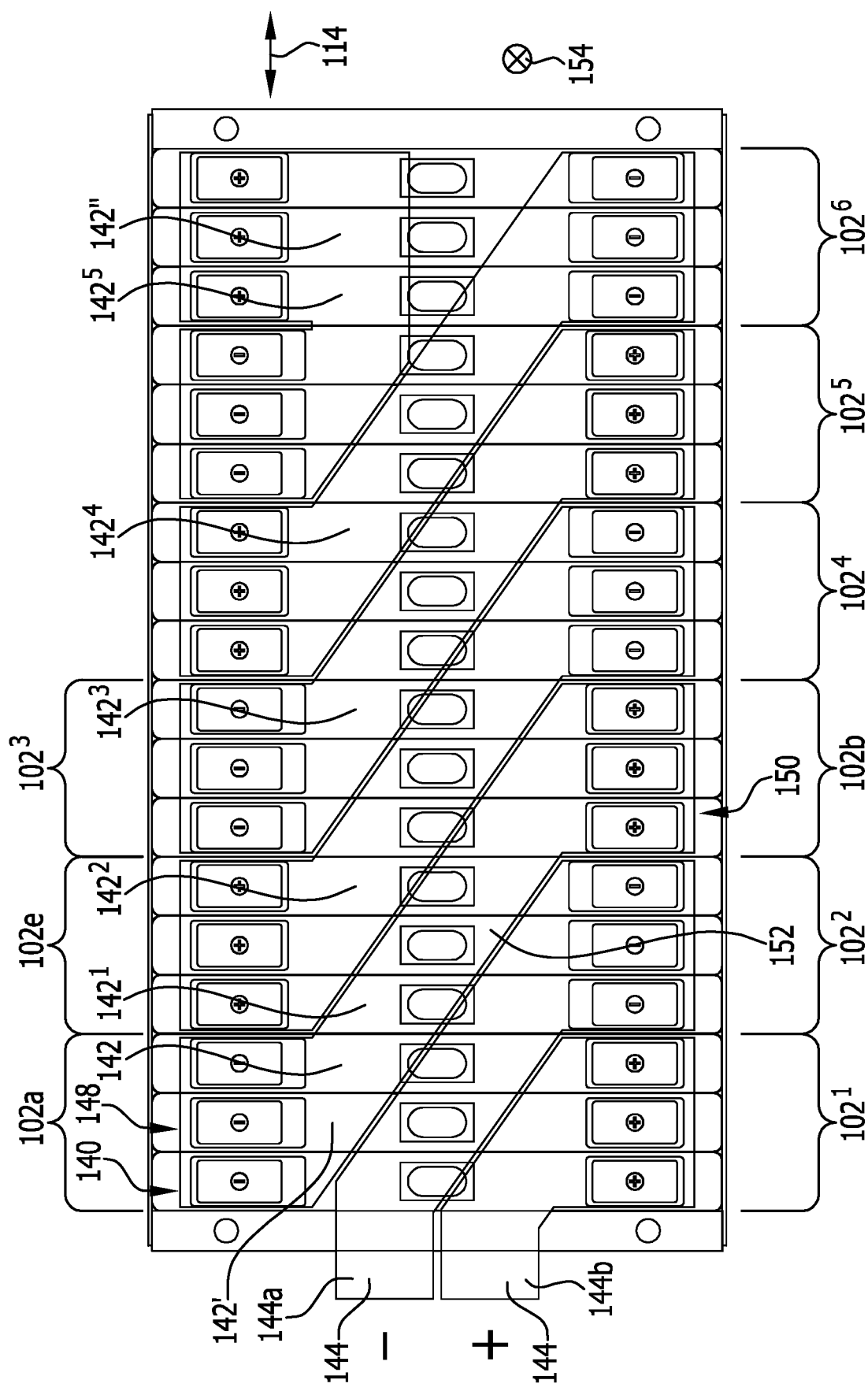

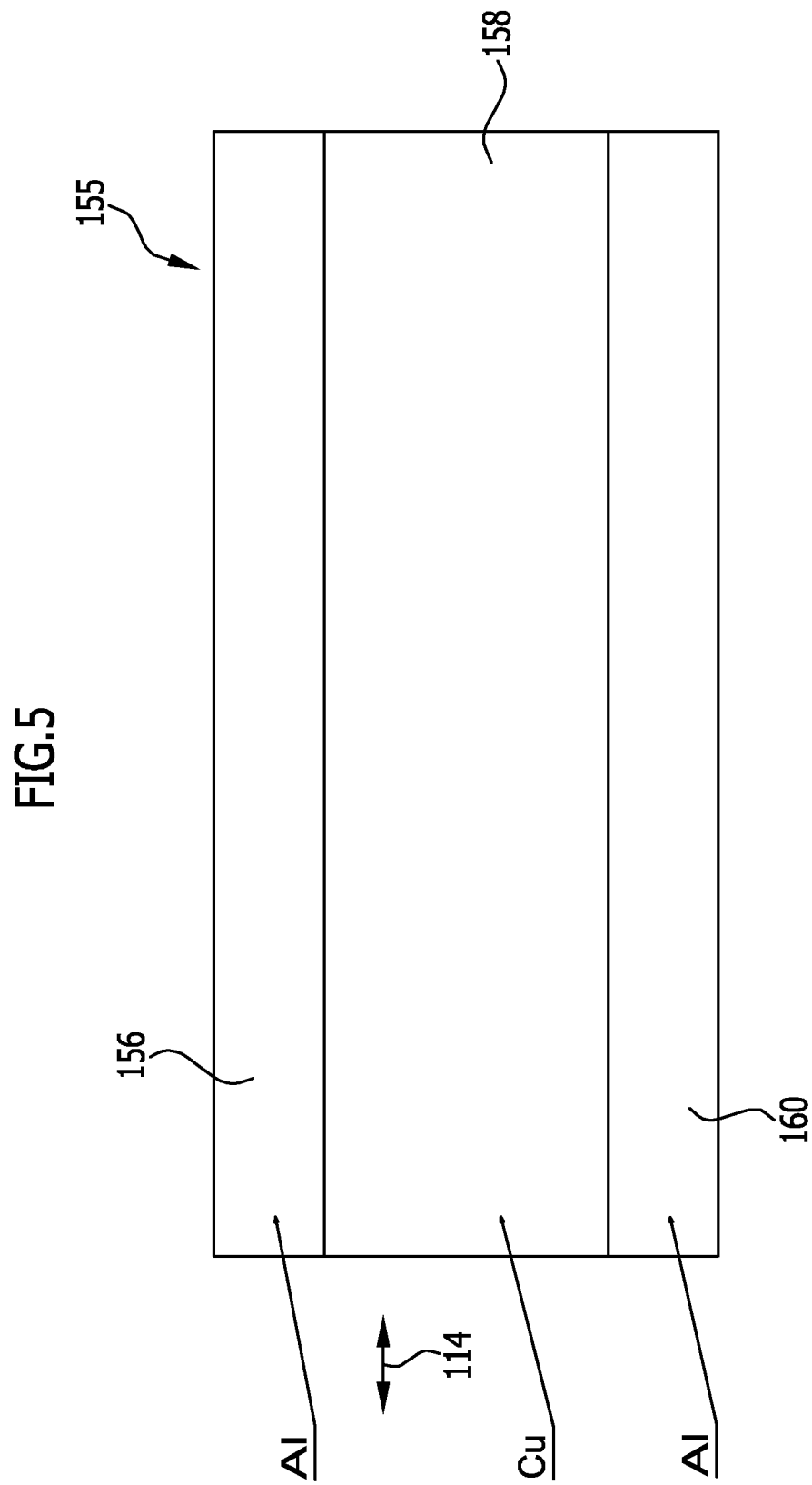

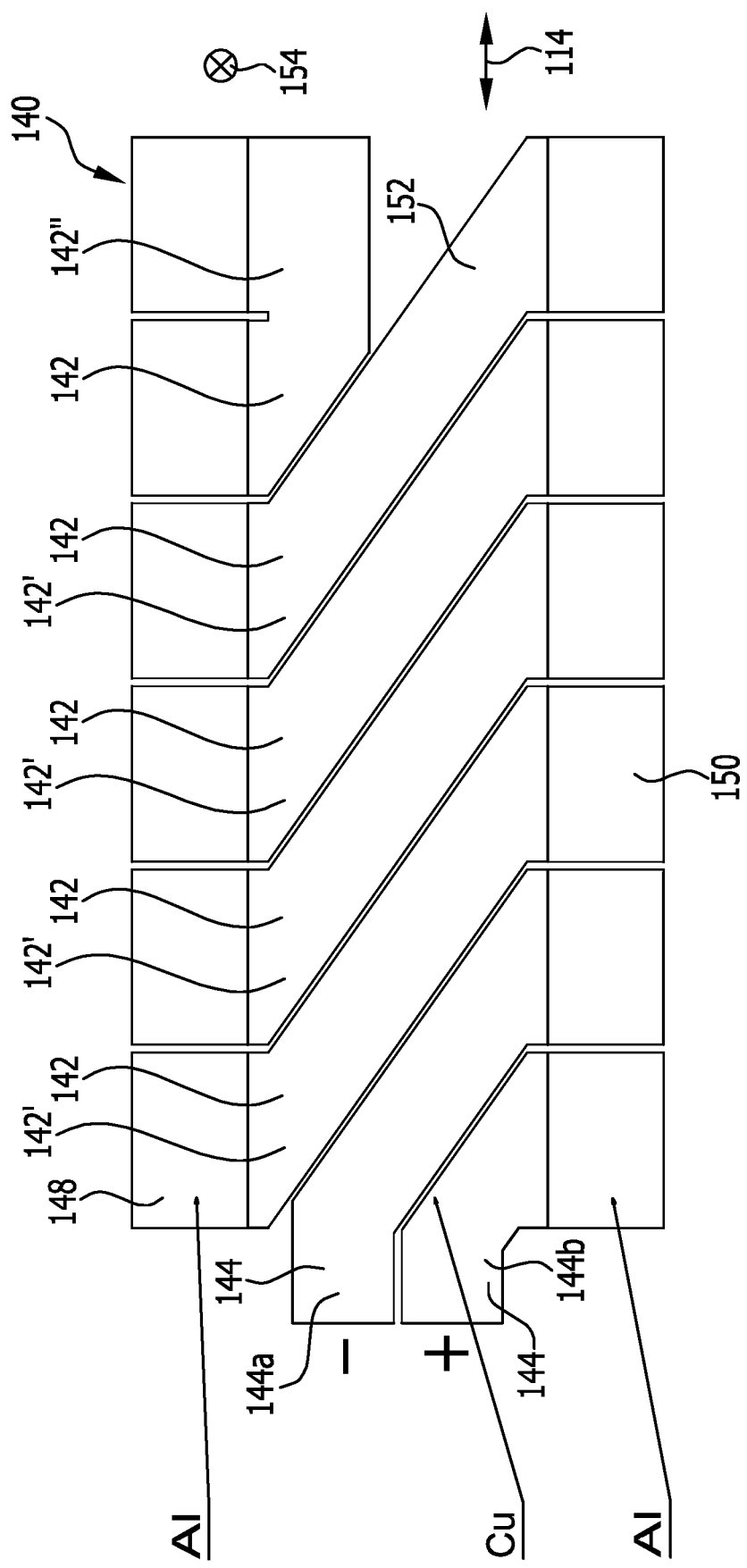

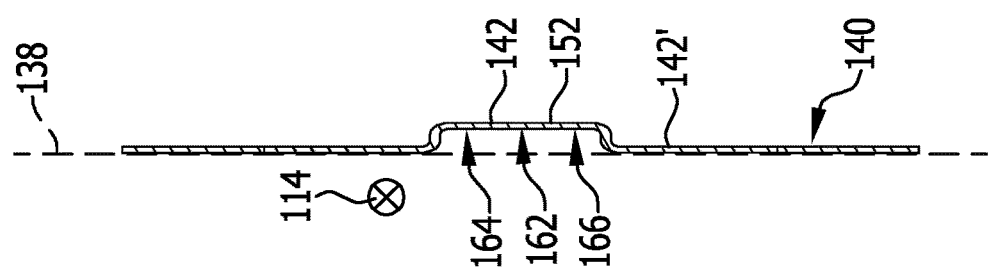
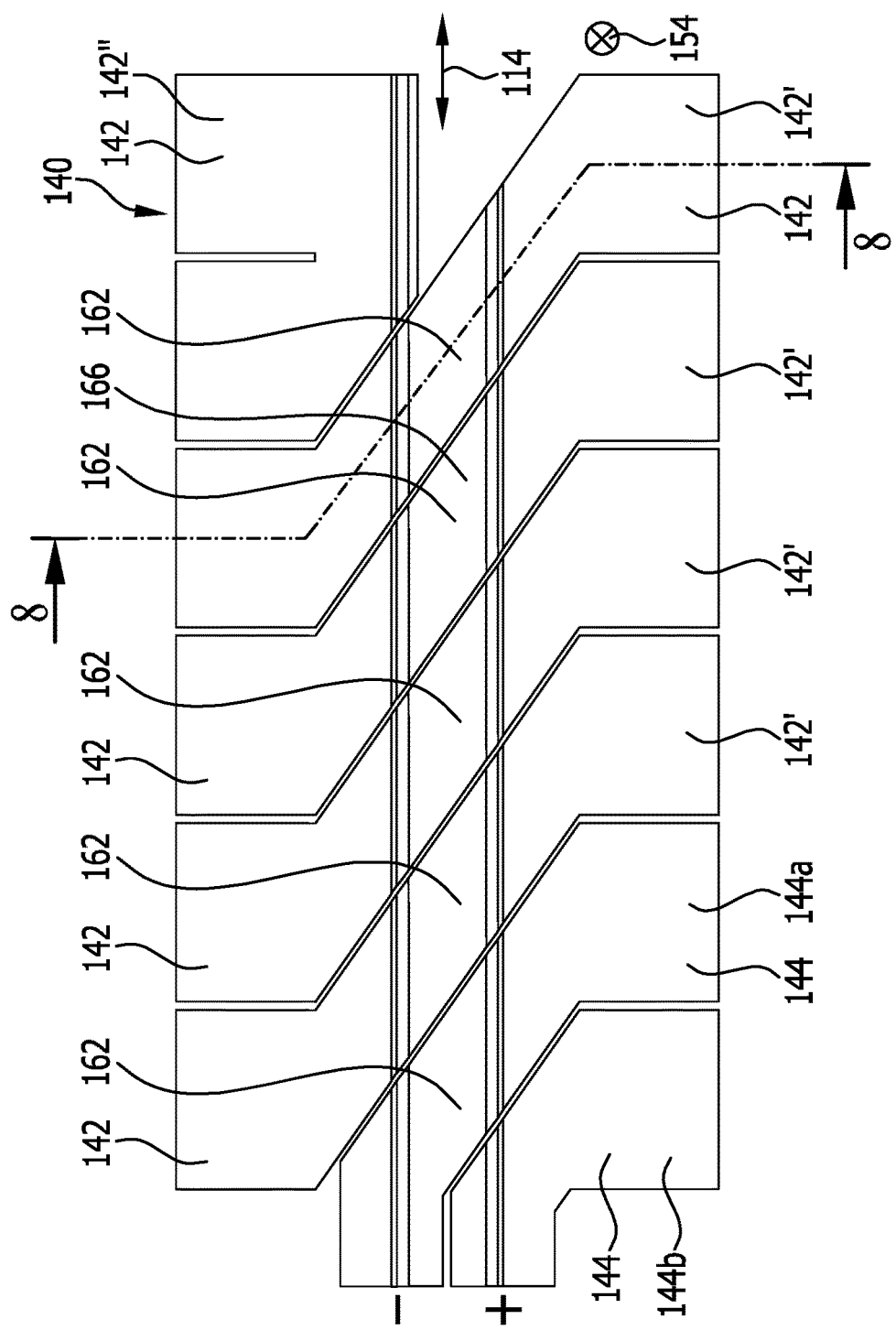

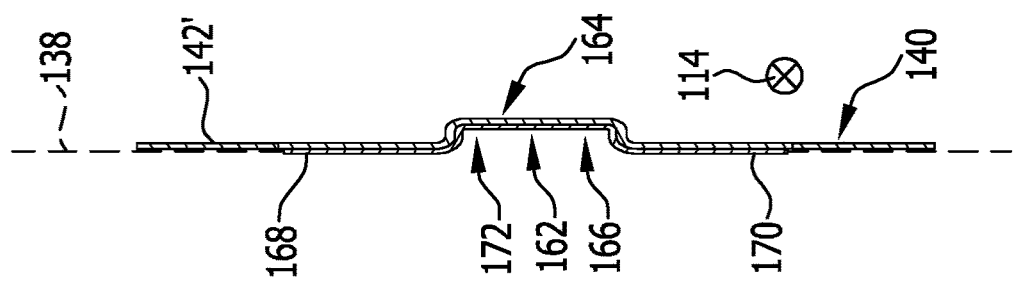
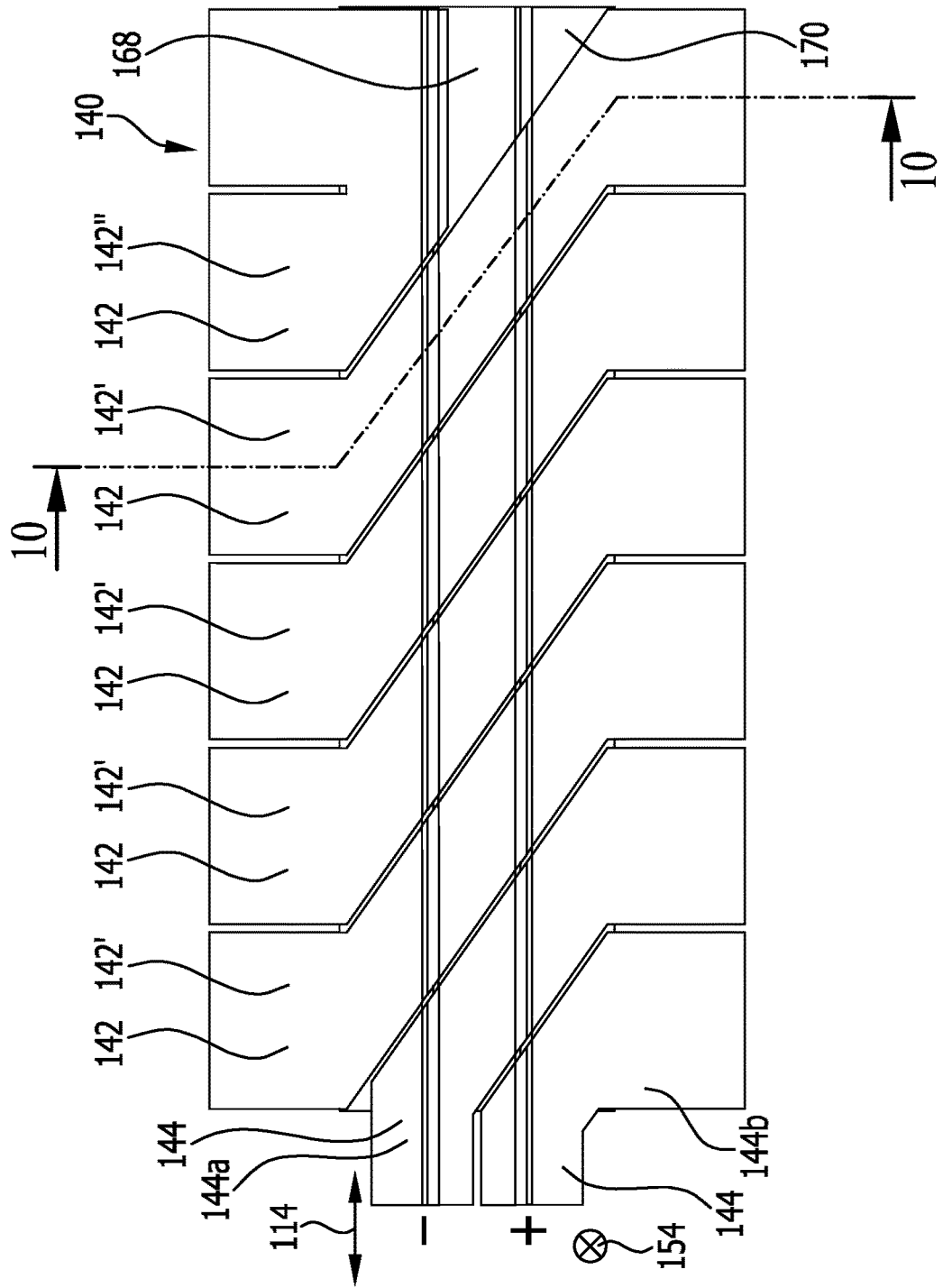

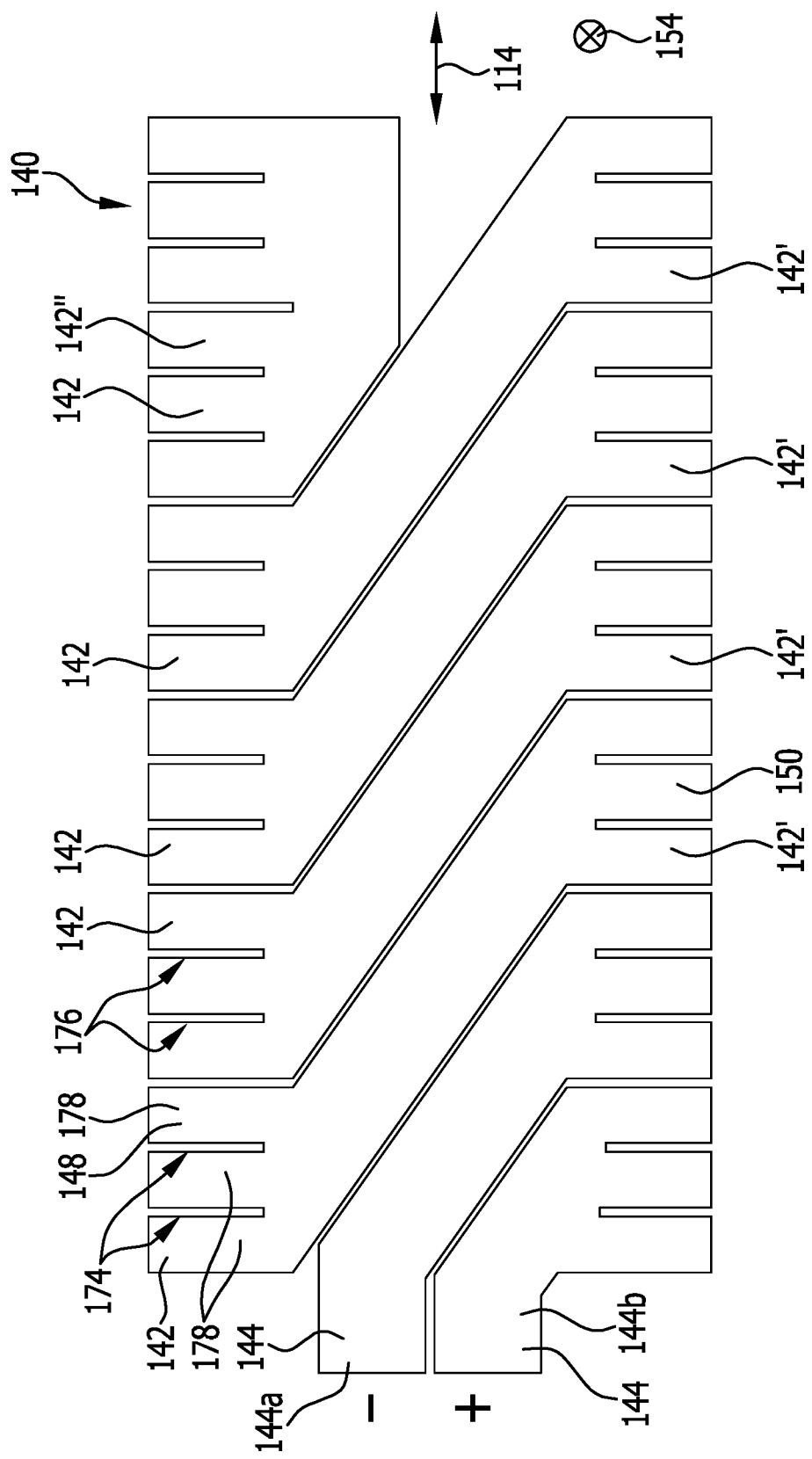

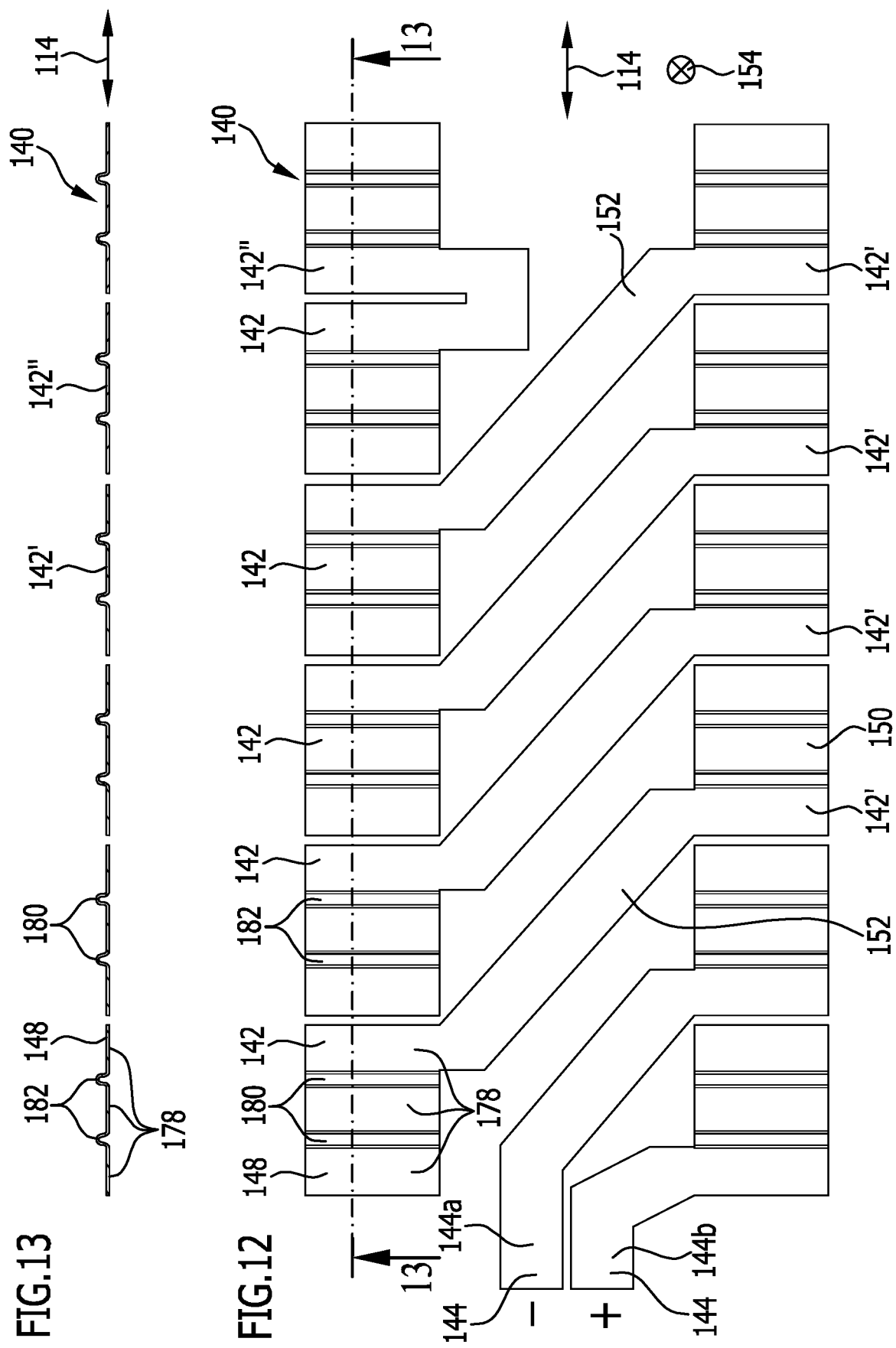

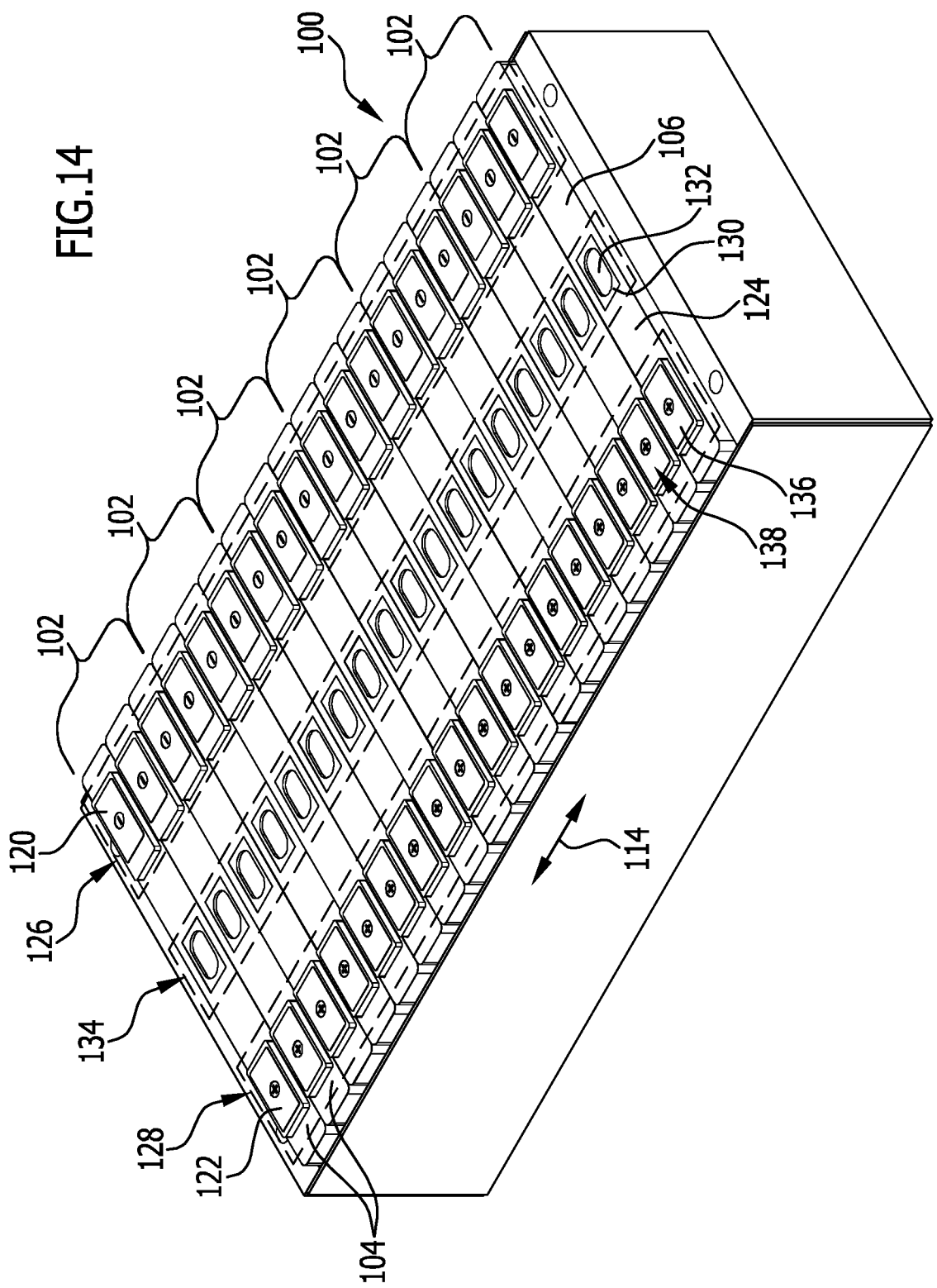

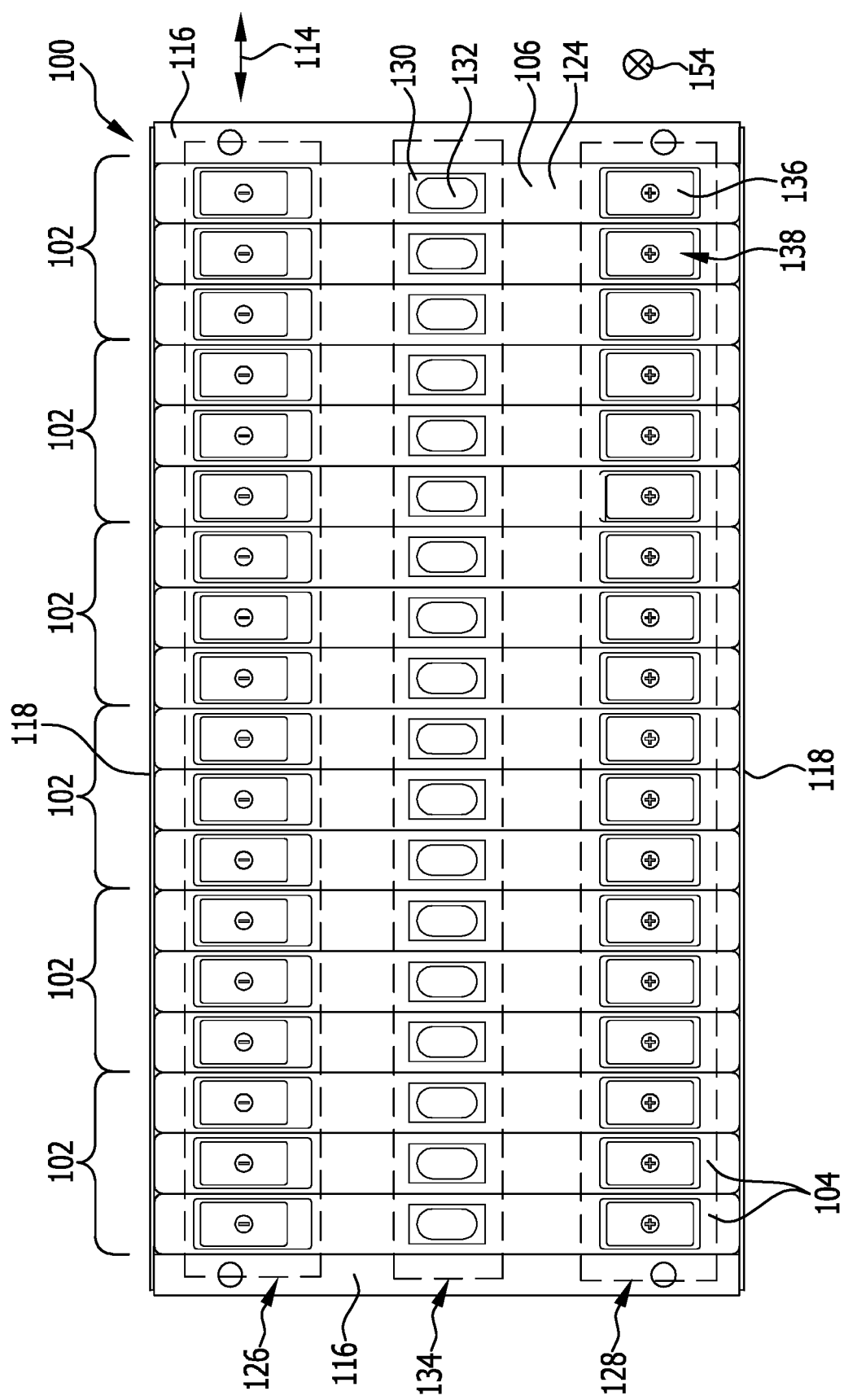

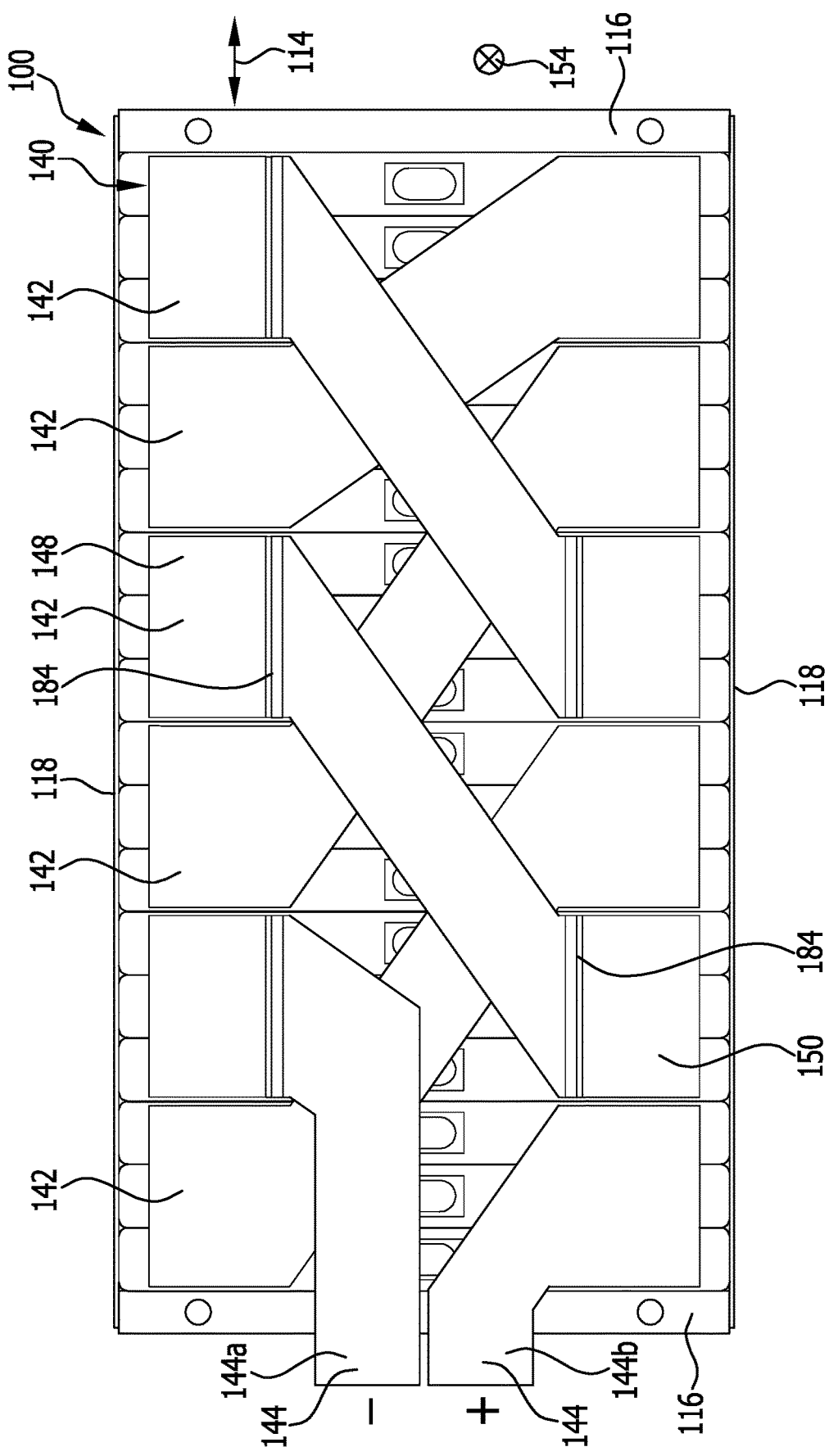

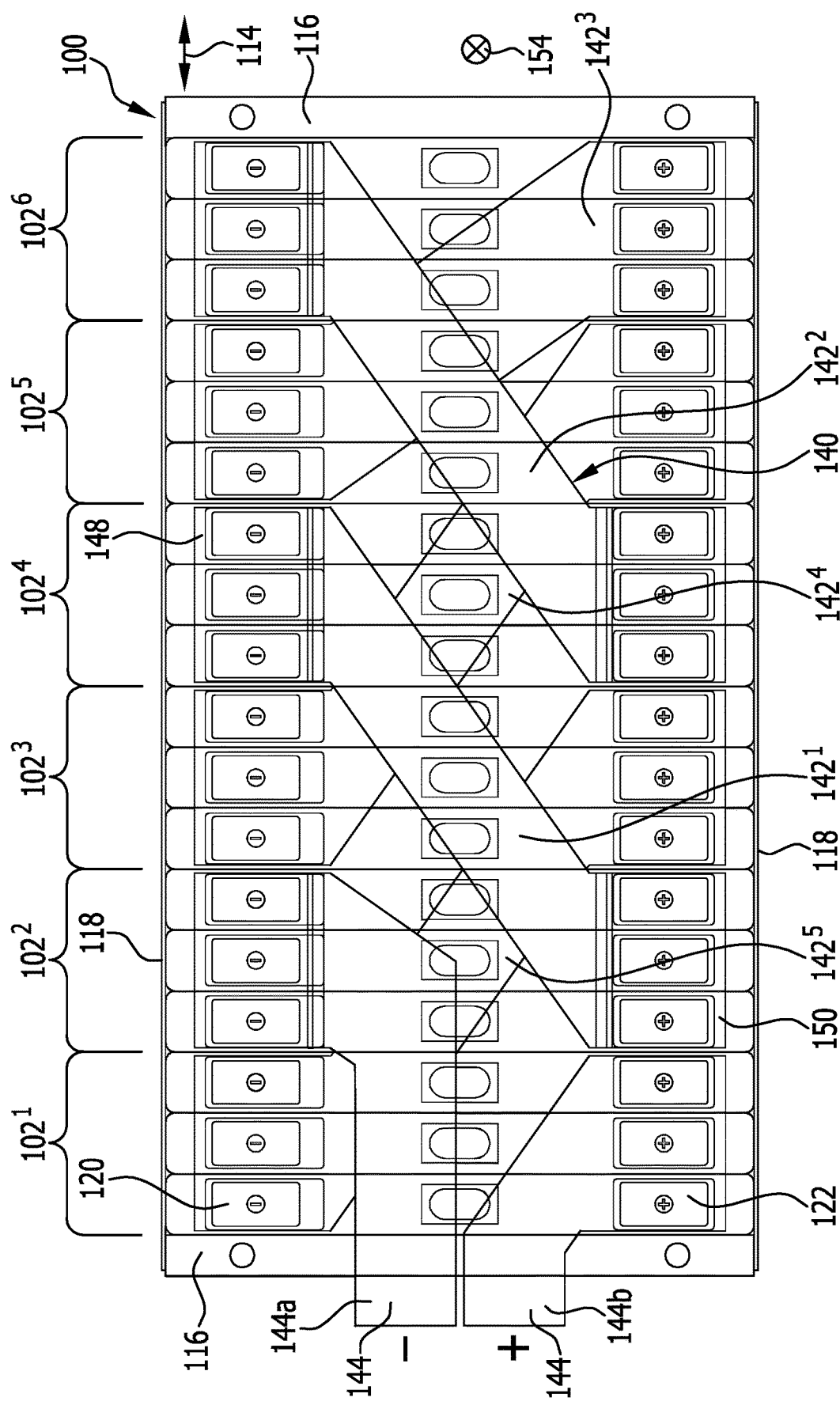

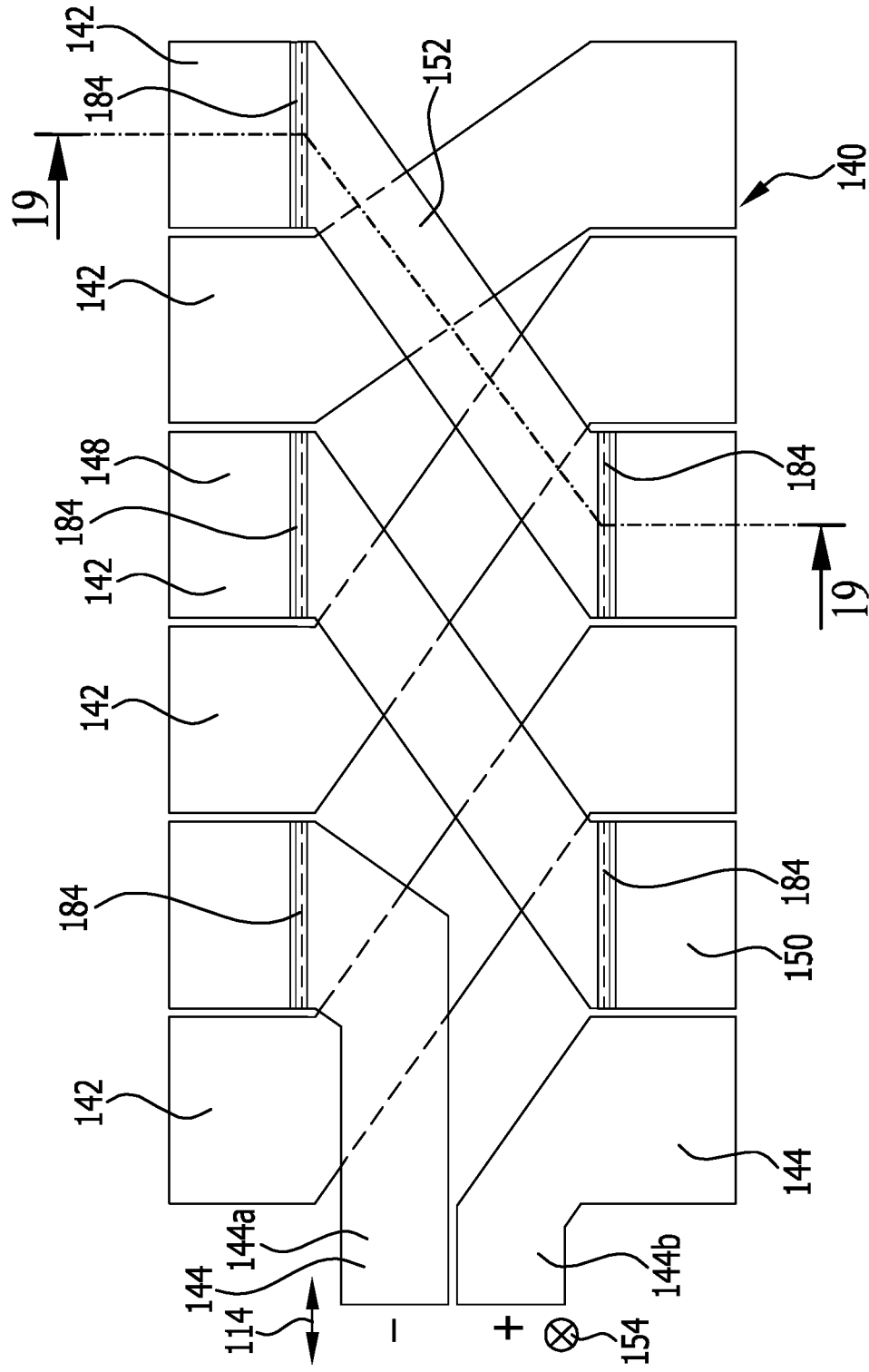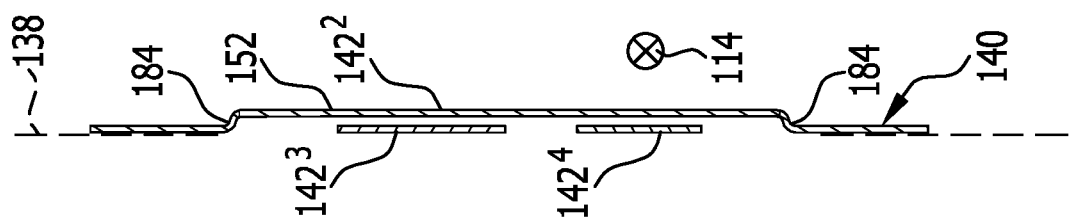

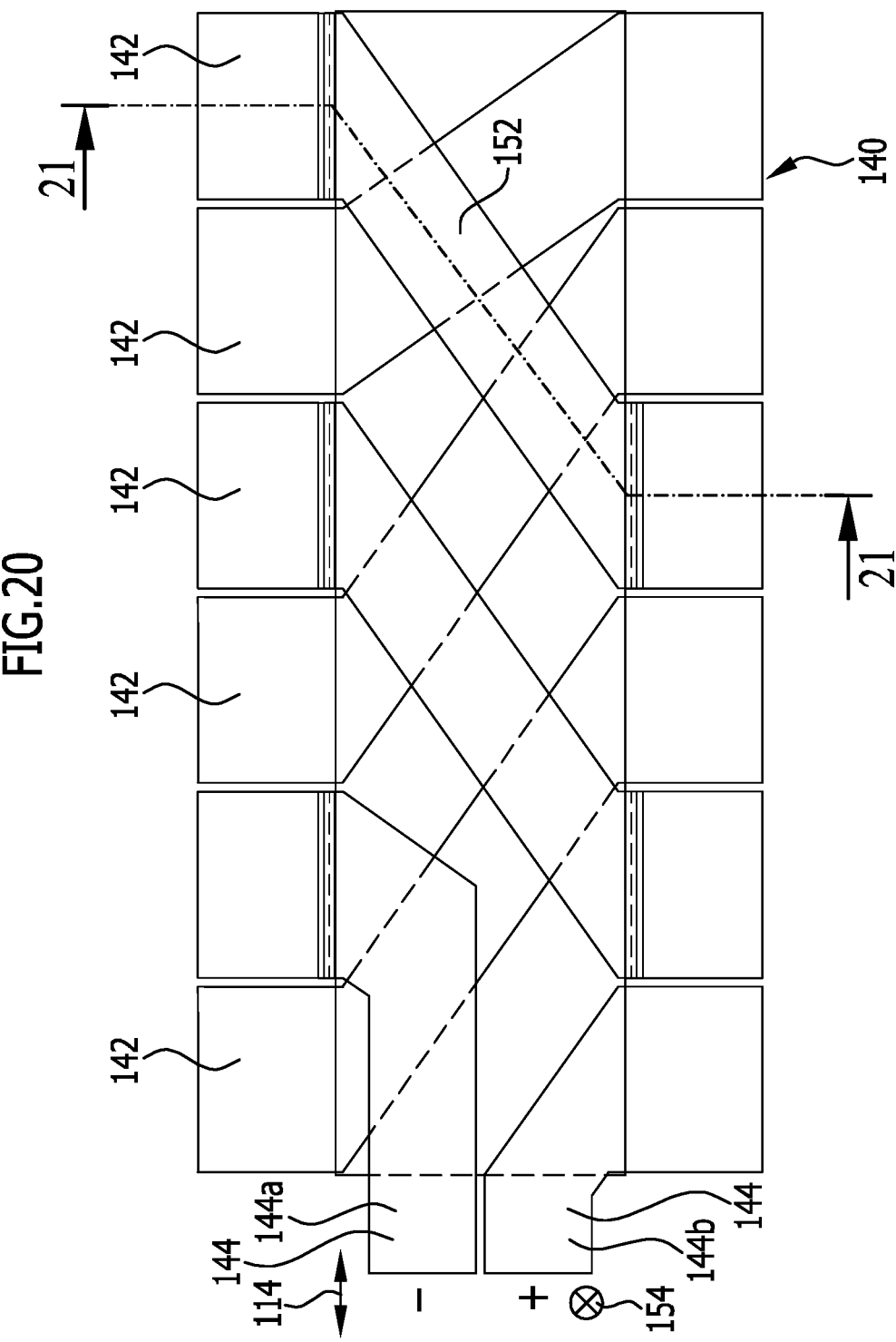

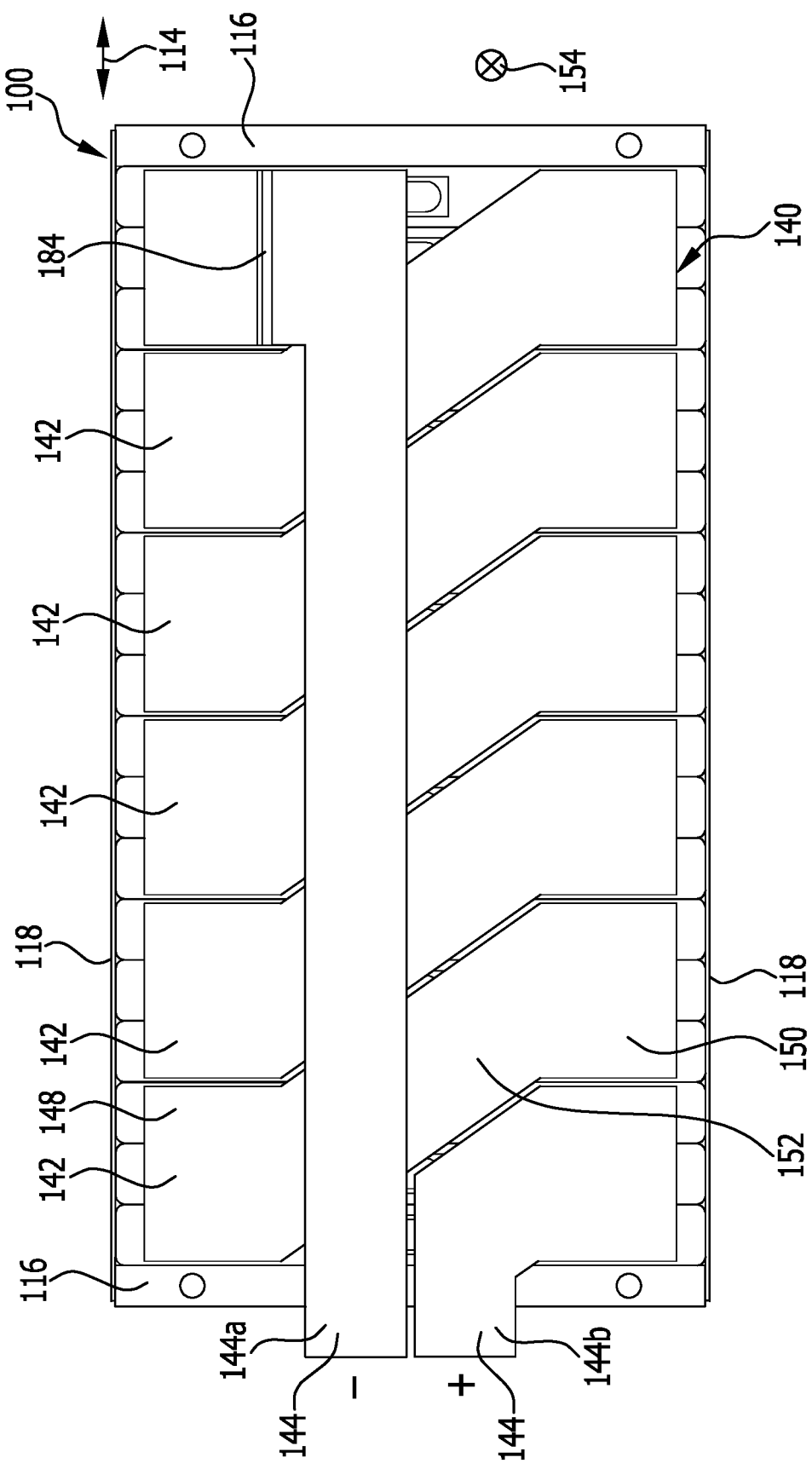

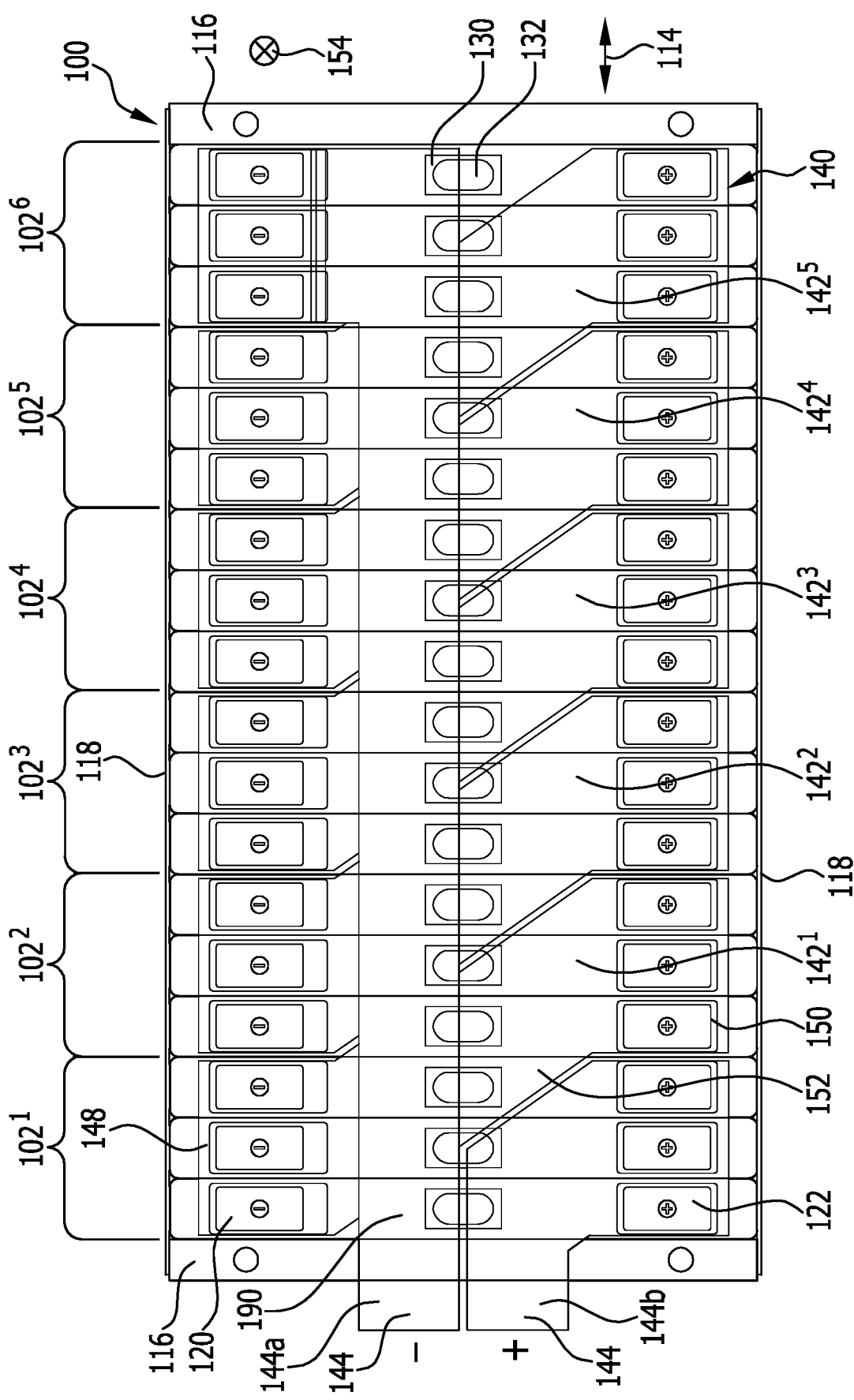

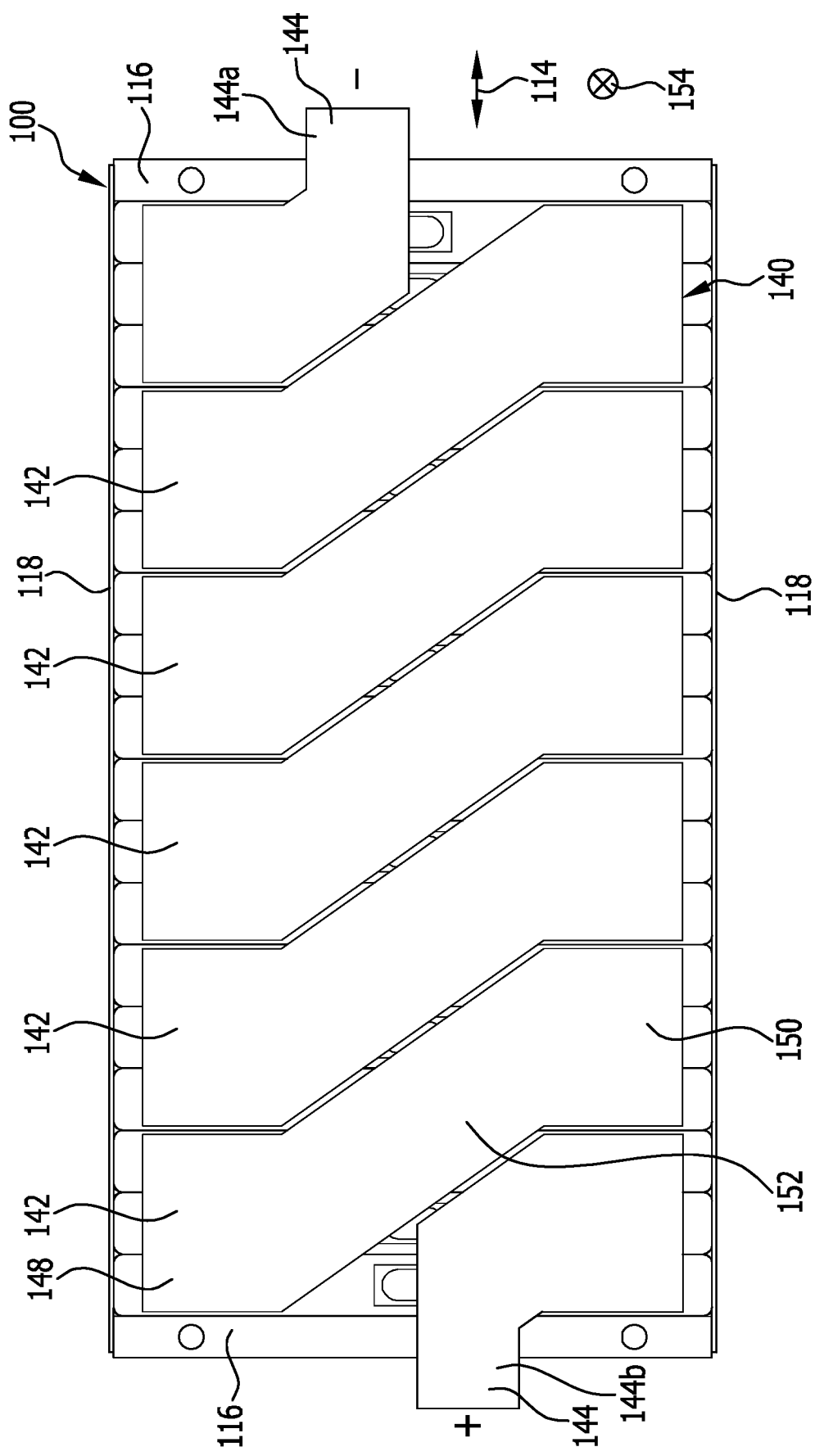

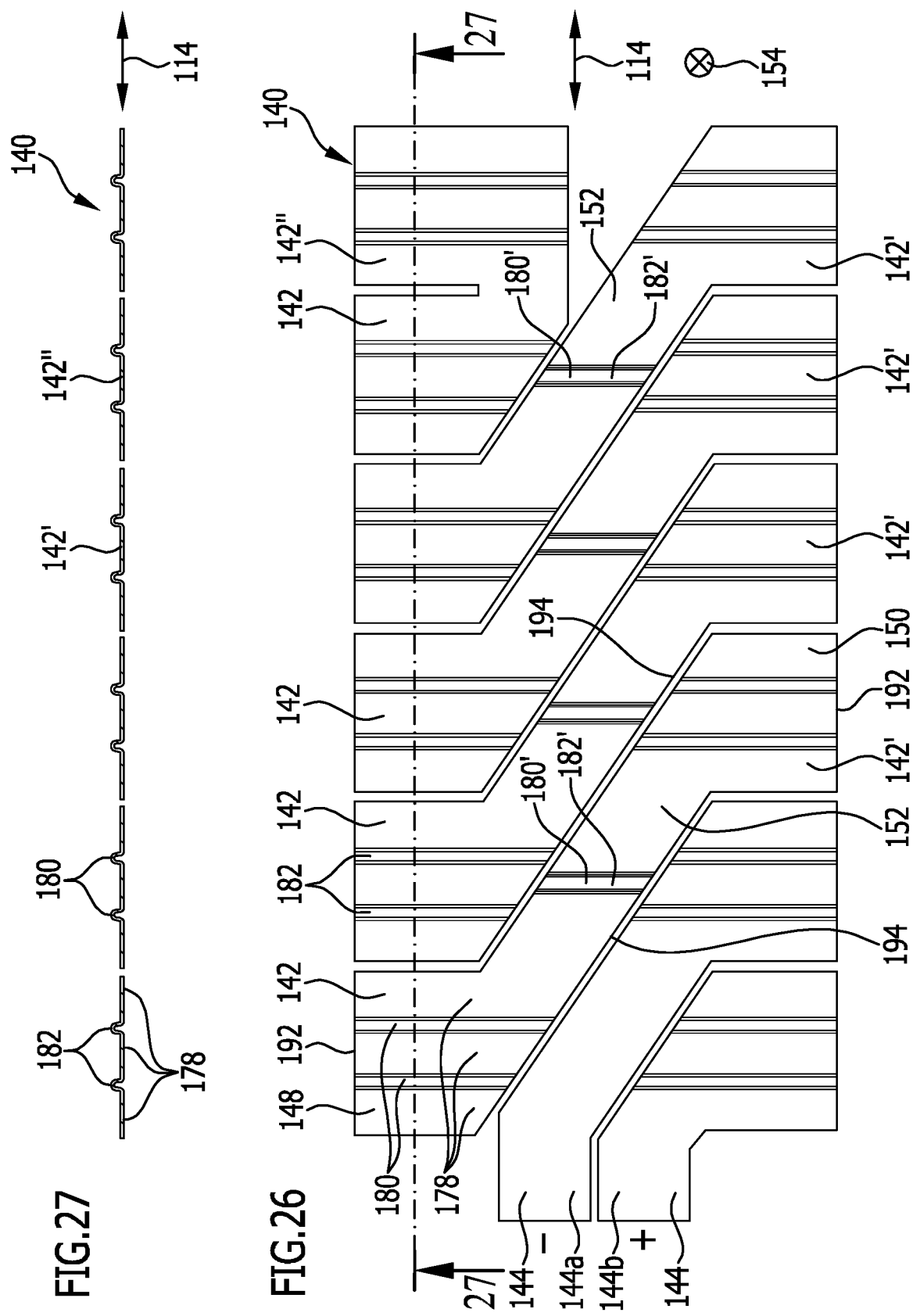

CELL CONTACTING SYSTEM FOR AN ELECTROCHEMICAL DEVICE

CROSS-REFERENCE TO RELATED APPLICATIONS

This application is a continuation of U.S. application Ser. No. 16/404,410, filed May 6, 2019, which is a continuation of international application number PCT/EP2017/078345 filed on 6 Nov. 2017 and claims the benefit of German application number DE 10 2016 121 265.2 filed on 7 Nov. 2016, which are incorporated herein by reference in their entirety and for all purposes.

FIELD OF DISCLOSURE

The present invention relates to a cell contacting system for an electrochemical device which comprises a plurality of cell groups that each comprise one or a plurality of electrochemical cells, wherein each electrochemical cell has a first cell terminal and a second cell terminal, wherein the electrochemical cells follow each other along a longitudinal direction of the electrochemical device, the first cell terminals of the electrochemical cells follow each other along the longitudinal direction in a first cell terminal region of the electrochemical device, and the second cell terminals of the electrochemical cells follow each other along the longitudinal direction in a second cell terminal region of the electrochemical device, wherein the cell contacting system comprises at least one cell connector for electrically conductively connecting cell terminals of a first cell group to cell terminals of a second cell group, and wherein the cell connector comprises a first contact region for contacting the cell terminals of the first cell group and a second contact region for contacting the cell terminals of the second cell group.

BACKGROUND OF THE INVENTION

In known electrochemical devices with cell contacting systems of the kind stated above, prismatic electrochemical cells are arranged next to each other in the longitudinal direction of the electrochemical device in such a way that in each cell terminal region, cell terminals with a positive polarity and cell terminals with a negative polarity follow each other alternatingly in the longitudinal direction of the electrochemical device. For producing a series connection of said electrochemical cells, in each case two directly adjacent cell terminals of different polarity are electrically conductively connected to each other by means of a cell connector which extends in parallel to the longitudinal direction of the electrochemical device from the one cell terminal to the other cell terminal and is secured on both cell terminals, for example by welding or screwing.

It is known in the case of such cell contacting systems for compensating relative movements between the electrochemical cells, for example due to different heat expansion, to provide the cell connector with a balancing element, for example in the form of a shaft.

If, however, the space available between the cell terminals to be connected to each other is limited, then the geometry of such a compensating element is subject to tight restrictions, the functionality thereof thus being compromised.

SUMMARY OF THE INVENTION

The object underlying the present invention is therefore to create a cell contacting system of the kind stated at the outset which reliably enables a relative movement between the cell terminals of the electrical device to be electrically connected to each other, even if the spacings of the cell terminals following each other in the longitudinal direction of the electrical device are small.

This object is achieved in accordance with the invention in a cell contacting system with the features of the preamble of Claim 1 by at least one cell connector of the cell contacting system extending obliquely to the longitudinal direction of the electrochemical device from cell terminals of the first cell group in the first cell terminal region to cell terminals of the second cell group in the second cell terminal region.

The concept underlying the present invention is thus to interconnect the cell terminals of the electrochemical cells to each other at least partially not by means of cell connectors extending in parallel to the longitudinal direction of the electrochemical device within the same cell terminal region, but rather by means of one or a plurality of cell connectors which extends obliquely to the longitudinal direction from the first cell terminal region over to the second cell terminal region.

As a result of this interconnection of the current path in oblique or diagonal direction within the cell contacting system, the cell terminals of different polarity, which are electrically conductively connected to each other by the respective cell connector, are located spatially far apart from each other, such that enough space remains between the contact regions of the cell connector in order to provide balancing or compensation elements on the cell connector, or even to entirely forgo such compensation elements, as relative movements between the electrochemical cells connected to each other may be accommodated by a deformation of the intermediate region of the cell connector between the contact regions of the cell connector.

In particular, provision may be made for the cell connector to comprise an intermediate region connecting the first contact region and the second contact region to each other, the longitudinal axis of which intermediate region is aligned obliquely to the longitudinal direction of the electrochemical device.

Further, provision may be made for such an intermediate region to comprise lateral edges which are aligned obliquely to the longitudinal direction of the electrochemical device.

Provision is preferably made for the longitudinal axis and/or one or a plurality of lateral edges of the intermediate region to enclose with the longitudinal axis an angle of more than 10°.

Further, provision is preferably made for the longitudinal axis and/or one or a plurality of lateral edges of the intermediate region to enclose with the longitudinal direction of the electrochemical device an angle of less than 80°.

The longitudinal axis and/or one or a plurality of lateral edges of the intermediate region of the cell connector preferably run substantially in parallel to a contact plane of the electrochemical device, in which plane the contact surfaces of the cell terminal of the electrochemical device lie.

The intermediate region may have one or a plurality of balancing or compensation elements, for example compensation shafts, though may also be of substantially planar configuration, without such balancing or compensation elements.

In one particular embodiment of the invention, provision may be made for at least one cell connector to extend from cell terminals of the first cell group to cell terminals of a second cell group directly adjacent to the first cell group.

Alternatively or in addition hereto, provision may be made for at least one cell connector of the cell contacting system to extend from cell terminals of the first cell group to cell terminals of a second cell group not directly adjacent to the first cell group.

In this case, provision is preferably made for the at least one cell connector to extend across a further cell group of the electrochemical device arranged between the first cell group and the second cell group.

Such a diagonal or oblique interconnection of the cell groups with the cell connector skipping over in each case one or a plurality of cell groups offers the advantage of an improved and in particular homogeneous temperature distribution within the electrochemical device.

In one particular embodiment of the invention, provision is made for the electrochemical cells of the electrochemical device to be arranged between two face sides of the electrochemical device, which are aligned transversely, preferably substantially perpendicularly, to the longitudinal direction of the electrochemical device and are spaced apart from each other in the longitudinal direction of the electrochemical device, wherein the cell contacting system has two power connections of different polarity.

In this case, it is favorable for a simple connection of the cell contacting system to an external power supply and/or to an external consumer if the two power connections end on the same face side of the electrochemical device.

Alternatively hereto, provision may also be made, however, for the two power connections to end on different face sides of the electrochemical device, in particular on mutually opposite face sides of the electrochemical device.

The two power connections of the cell contacting system are preferably both arranged in the same plane which preferably runs in parallel to a contact plane of the electrochemical device, in which plane the contact surfaces of the cell terminals of the electrochemical cells of the electrochemical device lie.

The cell contacting system may comprise a plurality of cell connectors which—in particular when viewed in the direction perpendicular to the longitudinal direction of the electrochemical device and perpendicular to the contact plane of the electrochemical device, in which plane the contact surfaces of the cell terminals lie—do not overlap and in particular do not cross.

Provision is hereby preferably made for all cell connectors of the cell contacting system to not overlap.

In particular, provision may be made for, in the mounted state of the cell contacting system, all cell connectors of the cell contacting system to lie in the same plane which is preferably aligned in parallel to the contact plane of the electrochemical device.

Alternatively or in addition hereto, provision may be made for the cell contacting system to comprise at least two cell connectors which cross over each other—in particular when viewed perpendicular to the longitudinal direction of the electrochemical device and perpendicular to the contact plane of the cell terminals of the electrochemical device, in which plane the contact surfaces of the cell terminals lie.

In order to reliably avoid an electrical contact between the cell connectors crossing over each other, even in the case of a relative movement of the cell connectors crossing over each other, for example in the case of shocks or vibration that occur during the operation of the electrochemical device, provision may be made for at least one electrically insulating insulation element to be arranged between at least one cell connectors crossing over each other.

Further, provision may also be made for a power connection of the cell contacting system and at least one cell connector of the cell contacting system to cross over each other.

The electrochemical cells of the electrochemical device may each be provided with a degassing outlet in order to allow gas which arises in the electrochemical cell during the operation of the electrochemical device to escape through the degassing outlet and thus be able to prevent the emergence of an overpressure in the housing of the relevant electrochemical cell.

In a preferred embodiment of the invention, provision is made for at least one cell connector, in the mounted state of the cell contacting system, to cross at least one degassing outlet of an electrochemical cell and to be provided with a gas guidance channel section in the crossing region.

Such a gas guidance channel section may be formed, e.g., by a recess or indentation provided on the cell connector.

As a result of such a gas guidance channel section, an additional volume is created between the cell connector and the electrochemical cell, through which volume gas escaping, as the case may be, out of the degassing outlet is able to discharge.

Alternatively or in addition hereto, provision may be made for the cell contacting system to comprise a support element on which a plurality of cell connectors of the cell contacting system are arranged, wherein the support element, in the mounted state of the cell contacting system, crosses at least one degassing outlet of an electrochemical cell and is provided with a gas guidance channel in the crossing region.

Such a gas guidance channel may be formed, in particular, by a recess or indentation provided on the support element.

The gas guidance channel preferably extends in the longitudinal direction of the electrochemical to at least one face side thereof, such that gas escaping, as the case may be, out of the degassing outlets of the electrochemical cells is able to discharge out of the electrochemical device through the gas guidance channel of the support element via at least one face side of the electrochemical device.

The support element is preferably formed of an electrically insulating material in order to maintain the electrical insulation between the cell connectors of the cell contacting system.

In order to enable relative movements between the cell terminals of the same polarity, which are electrically conductively connected to a cell connector, provision may be made for at least one cell connector to have in at least one of its contact regions at least one recess which separates two sections of the contact region from each other, which are provided for contacting different cell terminals of the same cell group.

Such a recess may have the form of a gap or a slit, for example.

Alternatively or in addition hereto, for enabling a relative movement between the cell terminals of the same cell group, provision may be made for at least one cell connector to have in at least one of its contact regions at least one elastically and/or plastically deformable compensation section which connects two sections of the contact region to each other, which are provided for contacting different cell terminals of the same cell group.

In a particular embodiment of the invention, provision may be made for at least one cell connector of the cell contacting system to have been separated out of a sheet-like, in particular a plate or band-shaped, starting material which comprises a first material section of a first material for forming at least one contact region of the cell connector and at least one second material section of a second material for forming an intermediate region of the cell connector that connects the contact regions of the cell connector to each other.

In particular, provision may be made for a plurality of cell connectors of the cell contacting system to have been separated together out of the sheet-like starting material.

After being separated out of the starting material, the cell connectors of the cell contacting system hereby preferably form a conductor grouping which is handleable as a unit, such that, when mounting the cell contacting system on the electrochemical device, all cell connectors of the cell contacting system are able to be brought into contact simultaneously with the respectively associated cell terminals of the electrochemical cells of the electrochemical device.

The cell connectors in the conductor grouping are hereby first connected to each other as one piece, preferably by connecting elements, in particular in the form of connecting webs.

The connecting elements of the conductor grouping are preferably separated from the cell connectors and removed from the cell contacting system only after arranging the cell connectors on a support element, in order to produce the necessary electrical insulation between the cell connectors. After separating off the connecting elements, the subassembly of the support element and the cell connectors arranged thereon is mounted to the cell terminals of the electrochemical device.

Alternatively hereto, provision may also be made for the conductor grouping to be introduced into a separating tool in which the connecting elements are separated from the cell connectors, wherein the cell connectors are then moved from the separating tool to the cell terminals of the electrochemical device by means of a gripping device, for example by means of a multiple-gripper, and are mounted on said cell terminals.

The first material of the first material section and the second material of the second material section are preferably mutually different.

In particular, provision may be made for the first material to contain aluminum as its main component and/or for the second material to contain copper as its main component.

The main component of a material is hereby that element which has the greatest proportion by weight in the relevant material.

The first material section and the second material section of the starting material may be connected to each other, in particular by a substance-to-substance bond, for example by cold-rolling plating.

Further, the sheet-like starting material may comprise, in addition to the first material section and the second material section, a third material section of a third material for forming at least one further contact region of the cell connectors.

The third material of the third material section is preferably identical to the first material of the first material section.

The second material section of the sheet-like starting material is preferably arranged between the first material section and the third material section.

By separating out the cell connectors of the cell contacting system (and optionally also the power connections of the cell contacting system) together out of a sheet-like starting material which contains a plurality of material sections of different materials, the production of the cell contacting system and the mounting thereof on the electrochemical device is made significantly simpler and faster.

By using different materials in the sheet-like starting material, the materials for the contact regions on the one hand and for the intermediate regions of the cell connectors on the other hand may each be optimally selected, for example a first material with the main component aluminum for simple, preferably varietally pure, welding to the cell terminals, and a second material with the main component copper for achieving a highest possible electrical conductivity in the intermediate region of the cell connectors.

This concept can be used independently of the diagonal or oblique interconnection of the cell terminals of the electrochemical device.

The cell contacting system in accordance with the invention is suitable in particular for use in combination with an electrochemical device which comprises a plurality of cell groups that each comprise one or a plurality of electrochemical cells, wherein each electrochemical cell has a first and a second cell terminal, wherein the electrochemical cells follow each other along a longitudinal direction of the electrochemical device, the first cell terminals of the electrochemical cells follow each other along the longitudinal direction in a first cell terminal region of the electrochemical device, and the second cell terminals of the electrochemical cells follow each other along the longitudinal direction in a second cell terminal region of the electrochemical device.

The first cell terminals of the electrochemical cells may hereby all have the same polarity (negative or positive), or the first cell terminals of the cell groups following each other in the longitudinal direction may have alternating polarities.

Likewise, the second cell terminals of the electrochemical cells may all have the same polarity (positive or negative), or the first polarities of the second cell terminals of the cell groups following each other along the longitudinal direction may alternate.

The cell contacting system in accordance with the invention may in particular have the following advantages or features:

A gas guidance channel may be integrated into the cell contacting system, through which gas escaping out of the electrochemical cells is able to discharge.

The cell connectors which are interconnected diagonally or obliquely and have a greater surface area due to their greater length have better cooling properties. In particular, a better connection of an external cooling to the large-area cell connectors is possible.

A decoupling between the cell terminals of a cell group having the same polarity is possible as a result of recesses and/or compensation elements which are provided in the contact regions of the cell connectors.

Signals necessary for cell monitoring, for example for monitoring voltage and/or temperature, may all be gathered on a face side of the electrochemical device or preferably on the same longitudinal side (running parallel to the longitudinal direction of the electrochemical device) of the electrochemical device, wherein in the latter case, the number of components required and the operations necessary is reduced.

The integration of one or a plurality of power connections into the cell contacting system is possible.

The cell connectors and, as the case may be, also the power connections of the cell contacting system may be produced of a sheet-like starting material composed of various materials, for example out of an aluminum/copper/aluminum band—which is preferably one layer.

In a direction running perpendicularly to a contact plane of the electrochemical device, in which plane the contact surfaces of the cell terminals lie, a plurality of material layers may be layered onto each other in order to in this way produce multi-layered cell connectors with the desired current-carrying capacity.

The electrochemical device may in particular be configured as an accumulator, for example as a lithium-ion accumulator.

If the electrochemical device is configured as an accumulator, then it is suitable in particular as a high-load-capacity energy source, for example for driving motor vehicles.

All polarities (negative and positive, respectively) stated above or in the following may also be interchanged with each other.

Further features and advantages of the invention are subject matter of the subsequent description and the graphical representation of exemplary embodiments.

BRIEF DESCRIPTION OF THE DRAWINGS

FIG. 2 shows a plan view from above of the electrochemical device from FIG. 1, viewed in the direction perpendicular to the longitudinal direction of the electrochemical device and perpendicular to a contact plane of the cell terminals;

FIG. 3 shows a plan view from above of the electrochemical device from FIGS. 1 and 2 after the mounting of a first embodiment of a cell contacting system which comprises a plurality of cell connectors for electrically conductively connecting cell terminals of a first cell group to cell terminals of a second cell group, wherein the respective cell connector comprises a first contact region for contacting the cell terminals of the first cell group and a second contact region for contacting the cell terminals of the second cell group, and wherein the respective cell connector extends obliquely to the longitudinal direction of the electrochemical device from cell terminals of the first cell group in the first cell terminal region to cell terminals of the second cell group in the second cell terminal region;

FIG. 4 shows a view, corresponding to FIG. 3, of the electrochemical device and of the cell contacting system, wherein the cell connectors and power connections of the cell contacting system are depicted transparently, so that the polarity of the cell terminals of the electrochemical device contacted by means of the cell contacting system is able to be recognized;

FIG. 5 shows a plan view of a plate- or band-shaped starting material out of which the cell connectors and power connections of the cell contacting system from FIGS. 3 and 4 can be separated, wherein the starting material comprises a first material section of a first material (for example aluminum) for forming a first contact region of the cell connectors, a second material section of a second material (for example copper) for forming an intermediate region of the cell connectors connecting the contact regions of the cell connectors to each other, and a third material section, preferably of the first material (for example aluminum), for forming a second contact region of the cell connectors;

FIG. 6 shows the cell contacting system produced by being separated together out of the plate- or band-shaped starting material from FIG. 5;

FIG. 7 shows plan view of a second embodiment of the cell contacting system in which a plurality of cell connectors of the cell contacting system, in the mounted state of the cell contacting system, each cross at least one degassing outlet of the electrochemical device and are provided with a gas guidance channel section in this crossing region;

FIG. 8 shows a cross section through the cell contacting system from FIG. 7, along the line 8-8 in FIG. 7;

FIG. 9 shows a plan view of a third embodiment of the cell contacting system in which the cell contacting system comprises a support element on which a plurality of cell connectors and/or power connections of the cell contacting system are arranged, wherein the support element, in the mounted state of the cell contacting system, crosses degassing outlets of electrochemical cells of the electrochemical device and is provided with a gas guidance channel in this crossing region;

FIG. 10 shows a cross section through the cell contacting system from FIG. 9, along the line 10-10 in FIG. 9;

FIG. 11 shows a fourth embodiment of a cell contacting system in which the cell connectors each have in the contact regions thereof a plurality of recesses which each separate two sections of the respective contact region from each other, which are provided for contacting different cell terminals of the same cell group;

FIG. 12 shows a plan view of a fifth embodiment of a cell contacting system in which the cell connectors each have in the contact regions thereof a plurality of elastically and/or plastically deformable compensation sections which each connect two sections of the respective contact region to each other, which are provided for contacting different cell terminals of the same cell group;

FIG. 13 shows a longitudinal section through the cell contacting system from FIG. 12, along the line 13-13 in FIG. 12;

FIG. 14 shows a perspective view of a second embodiment of an electrochemical device which comprises a plurality of cell groups which each comprise a plurality of, for example three, electrochemical cells, wherein each electrochemical cell has a first and a second cell terminal, wherein the electrochemical cells follow each other along a longitudinal direction of the electrochemical device, the first cell terminals of the electrochemical cells follow each other along the longitudinal direction in a first cell terminal region of the electrochemical device, and the second cell terminals of the electrochemical cells follow each other along the longitudinal direction in a second cell terminal region of the electrochemical device, wherein all first cell terminals of the electrochemical cells have the same (for example negative) polarity and all second cell terminals of the electrochemical cells also have the same polarity (for example the positive polarity);

FIG. 15 shows a plan view of the electrochemical device from FIG. 14, viewed in the direction perpendicular to the longitudinal direction of the electrochemical device and perpendicular to a contact plane of the cell terminals;

FIG. 16 shows a plan view of a sixth embodiment of the cell contacting system in which the cell connectors of the cell contacting system cross over each other;

FIG. 17 shows a view, corresponding to FIG. 16, of the electrochemical device and of the cell contacting system, wherein the cell connectors and power connections of the cell contacting system are depicted transparently, so that the polarity of the cell terminals contacted by means of the cell connectors and the power connections, respectively, are able to be recognized;

FIG. 18 shows a plan view of the cell contacting system from FIGS. 16 and 17, without the electrochemical device;

FIG. 19 shows a cross section through the cell contacting system from FIG. 18, along the line 19-19 in FIG. 18;

FIG. 20 shows a plan view of a seventh embodiment of the cell contacting system in which cell connectors which cross over each other are electrically separated from each other by an insulation element;

FIG. 21 shows a cross section through the cell contacting system from FIG. 20, along the line 21-21 in FIG. 20;

FIG. 22 shows a plan view of the electrochemical device from FIGS. 14 and 15 and an eighth embodiment of the cell contacting system, which comprises a power connection that extends from a face side of the electrochemical device across the cell connectors of the cell contacting system to the other face side of the electrochemical device;

FIG. 23 shows a view, corresponding to FIG. 22, of the electrochemical device and of the cell contacting system, wherein the cell connectors and power connections of the cell contacting system are depicted transparently, so that the polarity of the cell terminals contacted by means of the cell connectors and the power connections, respectively, are able to be recognized;

FIG. 24 shows a plan view of the electrochemical device from FIGS. 14 and 15 and a ninth embodiment of the cell contacting system in which the cell connectors and power connections of the cell contacting system do not cross each other and the two power connections of the electrochemical device end on different face sides of the electrochemical device;

FIG. 26 shows a plan view of a tenth embodiment of the cell contacting system, in which the cell connectors each have in the contact regions thereof a plurality of elastically and/or plastically deformable compensation sections that each connect two sections of the respective contact region to each other, which are provided for contacting different cell terminals of the same cell group, and in which the cell connections each have in the intermediate region thereof, which connects the two contact regions of the respective cell connector to each other, an elastically and/or plastically deformable compensation section which enables a relative movement between a section of the first contact region of the cell connector that is associated with a first cell terminal in the first cell terminal region of the electrochemical device, and is associated with a second cell terminal in the second cell terminal region of the electrochemical device; and FIG. 27 shows a longitudinal section through the cell contacting system from FIG. 26, along the line 27-27 in FIG. 26.

The same or functionally equivalent elements are provided with the same reference numerals in all Figures.

DETAILED DESCRIPTION OF THE INVENTION

Figure 1:
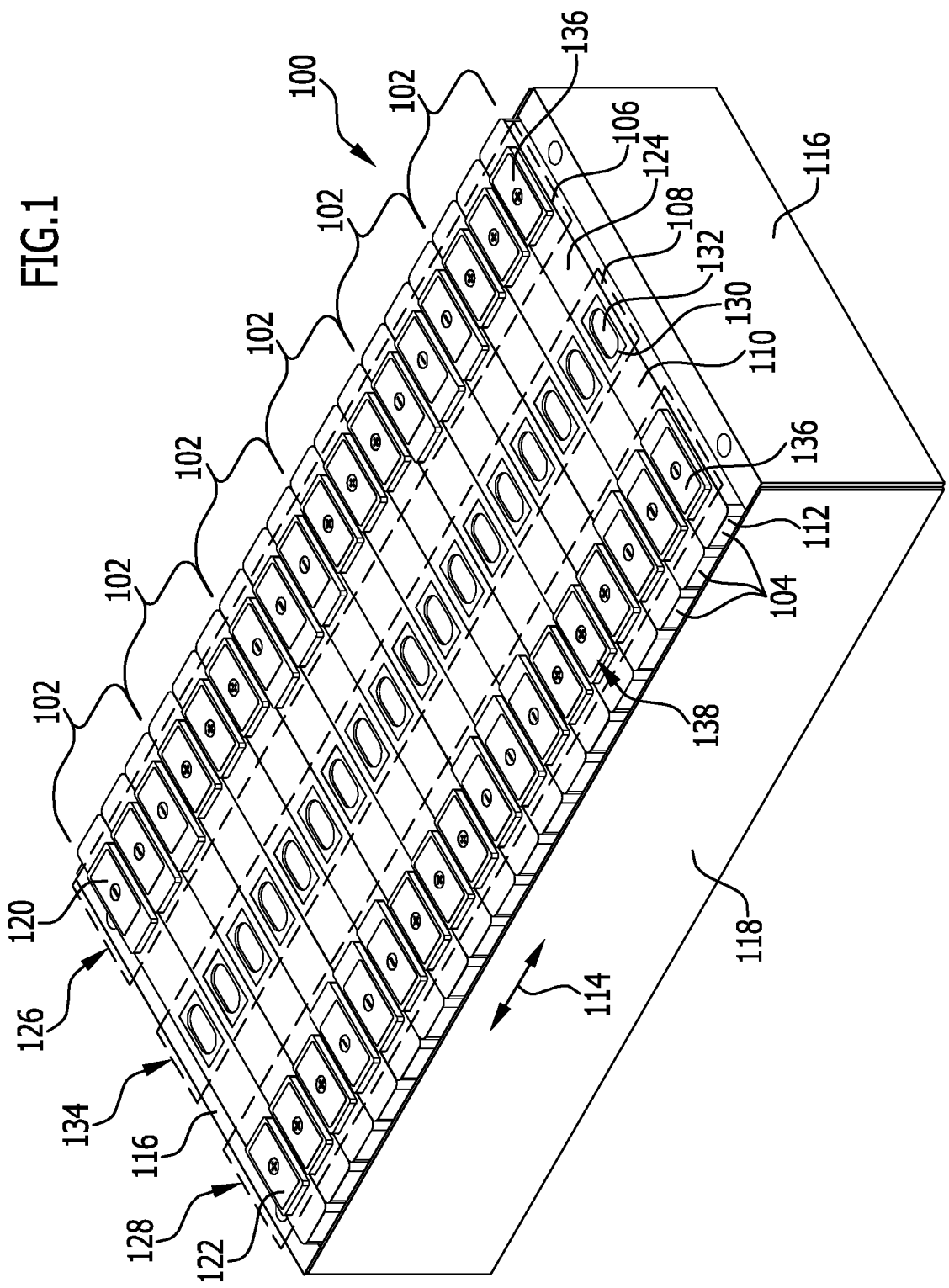
FIG. 1 shows a perspective depiction of an electrochemical device which comprises a plurality of cell groups, arranged between two side walls, that each comprise a plurality of, for example three, electrochemical cells, wherein each electrochemical cell has a first and a second cell terminal, wherein the electrochemical cells follow each other along a longitudinal direction of the electrochemical device, wherein the first cell terminals of the electrochemical cells follow each other along the longitudinal direction in a first cell terminal region of the electrochemical device, and wherein the second cell terminals of the electrochemical cells follow each other along the longitudinal direction in a second cell terminal region of the electrochemical device.

An electrochemical device, depicted in FIGS. 1 and 2 and designated as a whole with 100, comprises a plurality of, six in the embodiment depicted, cell groups 102 which each comprise a plurality of, three in the embodiment depicted, electrochemical cells 104.

Each of the electrochemical cells 104 has a prismatic, in particular substantially cuboidal, housing 106, wherein the housing 106 has in each case two opposing wide side faces 108, two opposing long narrow side faces 110, and two opposing short narrow side faces 112.

The electrochemical cells 104 of the electrochemical device 100, for example of a battery module, follow each other in a longitudinal direction 114 of the electrochemical device 100, wherein in each case two electrochemical cells 104 following each other in the longitudinal direction 114 abut against each other, substantially in area contact and preferably substantially congruently, with one of the wide side faces 108 thereof.

The cohesion of the electrochemical cells 104 of the electrochemical device 100 is generated by two face plates 116, the main faces of which are aligned perpendicularly to the longitudinal direction 114 and parallel to each other and which are spaced apart from each other in the longitudinal direction 114, wherein the electrochemical cells 104 of the electrochemical device 100 are arranged between the two face plates 116.

The two face plates 116 are preferably braced against each other by means of a plurality of, for example two, tension elements 118, for example in the form of tension anchors, tension plates, or tension bands, which are secured on both face plates 116, such that the face plates 116 exert a contact pressure, directed parallel to the longitudinal direction 114, on the electrochemical cells 104 of the electrochemical device 100.

Each of the electrochemical cells 104 has a first cell terminal 120 and a second cell terminal 122, wherein the first cell terminal 120 and the second cell terminal 122 have different polarity (negative or positive).

The first cell terminal 120 and the second cell terminal 122 both project out of the housing 106 of the respective electrochemical cell 104 over the same long narrow side face 110 of the respective electrochemical cell 104, which side face is subsequently referred to as the terminal side face 124 of the electrochemical cell 104.

The terminal side faces 124 of all electrochemical cells 104 of the electrochemical device 100 are arranged in parallel to each other and substantially flush with each other on the same side of the electrochemical device 100, such that the first cell terminals 120 of all electrochemical cells 104 of the electrochemical device 100 follow each other along the longitudinal direction 114 in a first cell terminal region 126 of the electrochemical device 100, and the second cell terminals 122 of all electrochemical cells 104 of the electrochemical device 100 follow each other along the longitudinal direction 114 in a second cell terminal region 128 of the electrochemical device 100.

In FIGS. 1 and 2, the first cell terminal region 126 and the second cell terminal region 128 are each marked by rectangles bound by broken lines.

Each of the electrochemical cells 104 further each comprises a degassing outlet 130, arranged on the terminal side face 124 between the first cell terminal 120 and the second cell terminal 122, with a degassing valve 132.

The degassing outlets 130 of all electrochemical cells 104 of the electrochemical device preferably follow each other along the longitudinal direction 114 of the electrochemical device 100 in a degassing region 134 of the electrochemical device 100.

The degassing region 134 is also marked in FIGS. 1 and 2 as a rectangle bound by broken lines.

The first cell terminals 120 and the second cell terminals 122 of the electrochemical cells 104 of the electrochemical device 100 preferably project over the terminal side faces 124 by the same height, such that the substantially planar contact surfaces 136 on which the cell terminals 120, 122 end all lie substantially in the same plane, which is subsequently referred to as the contact plane 138 of the electrochemical device 100.

In order to electrically connect the cell groups 102 of the electrochemical device 100 in series and to be able to connect the electrochemical cells 104 to an external power source and to an external consumer, respectively, the electrochemical device 100 is provided with a cell contacting system, depicted in FIGS. 3 and 4, which comprises a plurality of, five in the embodiment depicted, cell connectors 142 for electrically conductively connecting cell terminals of in each case one first cell group 102a to cell terminals of a second cell group 102b.

Further, the cell contacting system 140 comprises two power connections 144 which each are connected to cell terminals of a cell group 102c located at the beginning of the series connection, and to cell terminals of a cell group 102d located at the end of the series connection, respectively, and the free ends 146 thereof are guided out via a face plate 116 of the electrochemical device 100 in order to be contacted in the outer space of the electrochemical device 100 by in each case one electrical conductor (not depicted).

In the embodiment of the electrochemical device 100 and the cell contacting system 140 depicted in FIGS. 1 to 6, both power connections 144 are arranged on the same face side of the electrochemical device 100.

The cell connectors 142 of the cell contacting system 140 each comprise a first contact region 148 for contacting the cell terminals of the first cell group 102a and a second contact region 150 for contacting the cell terminals of the second cell group 102b.

Further, each of the cell connectors 142 comprises an intermediate region 152 connecting the first contact region 148 and the second contact region 150 to each other.

In a plurality of, for example four, cell connectors 142' of the cell contacting system 140 from FIGS. 3 and 4, a longitudinal axis 153 of the intermediate region 152 extends obliquely to the longitudinal direction 114 of the electrochemical device 100, such that the relevant cell connector 142' extends obliquely to the longitudinal direction 114 from cell terminals of the first cell group 102a in the first cell terminal region 126 to cell terminals of the second cell group 102b in the second cell terminal region 128.

In one of the cell connectors 142, which is referred to in the following as cell connector 142", the longitudinal axis 153' of the intermediate region 152', however, extends in parallel to the longitudinal direction 114 of the electrochemical device 100, such that said cell connector 142" extends in parallel to the longitudinal direction 114 from cell terminals of the first cell group 102a' in the first cell terminal region 126 to cell terminals of the second cell group 102b", which are also arranged in the first cell terminal region 126.

As can be seen best in FIG. 4, in which the cell connectors 142 and power connections 144 of the cell contacting system 140 are depicted transparently so that the polarity of the underlying cell terminals 120, 122 of the electrochemical cells 104 may be recognized, the cell connectors 142', which extend obliquely to the longitudinal direction 114 from the first cell terminal region 126 to the second cell terminal region 128, extend from cell terminals of the first cell group 102a to cell terminals of a second cell group 102b not directly adjacent to the first cell group 102a, wherein the respective cell connector 142' extends across a third cell group 102e of the electrochemical device 100, arranged between the first cell group 102a and the second cell group 102b.

As can be seen best in FIG. 4, the electrochemical cells 104 are arranged in the electrochemical device 100 such that the first cell terminals 120, arranged in the first cell terminal region 126, of cell groups 102 following each other in the longitudinal direction 114 of the electrochemical device 100 have alternating polarities.

Thus, the first cell terminals 120 of the cell group $102^1$ arranged to the far left in FIG. 4 have a negative polarity, the first cell terminals 120 of the second cell group $102^2$ following thereafter in the longitudinal direction 114 have a positive polarity, the first cell terminals 120 of the third cell group $102^3$ following thereafter in the longitudinal direction 114 have a negative polarity, the first cell terminals 120 of the fourth cell group $102^4$ following thereafter in the longitudinal direction 114 have a positive polarity, the first cell terminals 120 of the fifth cell group $102^5$ following thereafter in the longitudinal direction 114 have a negative polarity, and the first cell terminals 120 of the sixth cell group $120^6$ following thereafter in the longitudinal direction 114 have a positive polarity.

Therefore, the second cell terminals 122, arranged in the second cell terminal region 128 of the electrochemical device 100, of the cell groups 102 following each other in the longitudinal direction 114 have alternating polarities.

Thus, the second cell terminals 122 of the first cell group $102^1$ have a positive polarity, the second cell terminals 122 of the second cell group $102^2$ a negative polarity, the second cell terminals 122 of the third cell group $102^3$ a positive polarity, the second cell terminals 122 of the fourth cell group $102^4$ a negative polarity, the second cell terminals of the fifth cell group $102^5$ a positive polarity, and the second cell terminals 122 of the sixth cell group $102^6$ a negative polarity.

As result of the cell contacting system 140 described above, the cell terminals 120, 122 of the, in the embodiment depicted, six cell groups 102 which each comprise three electrochemical cells 104 are connected to each other in series.

Such a series connection is also referred to in short as an msnp connection, wherein m refers to the number of cell groups 102 connected in series one behind the other, and n the number of electrochemical units per cell group 102.

Therefore, in the embodiment depicted in FIGS. 1 to 6, it is a 6s3p connection.

In this series connection, the negative power connection 144a is connected to the negative second cell terminals 122 of the second cell group $102^2$.

The second cell connector $142^2$ connects the positive first cell terminals 120 of the second cell group $102^2$ to the negative second cell terminals 122 of the fourth cell group $102^4$.

The fourth cell connector $142^4$ connects the positive first cell terminals 120 of the fourth cell group $102^4$ to the negative second cell terminals 122 of the sixth cell group $102^6$.

The fifth cell connector $142^5$ connects the positive first cell terminals 120 of the sixth cell group $102^6$ to the negative first cell terminals 120 of the fifth cell group $102^5$.

The third cell connector $142^3$ connects the positive second cell terminals 122 of fifth cell group $102^5$ to the negative first cell terminals 120 of the third cell group $102^3$.

The first cell connector 142' connects the positive second cell terminals 122 of the third cell group 102³ to the negative first cell terminals 120 of the first cell group 102'.

The positive second cell terminals 122 of the first cell group 102' are connected to the positive power connection 144b of the cell contacting system 140.

Because the cell connectors 142 and the power connections 144 of the cell contacting system 140 from FIGS. 3 and 4 do not overlap each other (when viewed in a direction 154 standing perpendicular on the contact plane 138) and all are arranged in the same plane, aligned parallel to the contact plane 138 of the electrochemical device 100, the cell connectors 142 and the power connections 144 of the cell contacting system 140 may be separated, for example punched or cut, together out of a sheet-like starting material, preferably out of a metallic starting material, in particular out of a sheet metal material, in the form of a conductor grouping.

A suitable starting material is depicted in FIG. 5 and is preferably configured as a plate- or band-shaped hybrid material which comprises a first material section 156 of a first material for forming the first contact regions 148 of the cell connectors 142', running obliquely to the longitudinal direction 114, and the two contact regions 148 and 150 of the cell connector 142", a second material section 158 of a second material for forming the intermediate regions 152 connecting the two contact regions 148 and 150 of the cell connectors 142' to each other, and a third material section 160 of a third material for forming the second contact regions 150 of the cell connectors 142'.

In this case, the first material section 156, the second material section 158, and the third material section 160 are preferably configured as material strips running in the later longitudinal direction 114 of the cell contacting system 140.

The second material section 158 of the second material is preferably arranged between the first material section 156 of the first material and the third material section 160 of the third material.

The first material of the first material section 156 and the third material of the third material section 160 are preferably identical to each other.

In a preferred embodiment, provision is made for the first material to contain aluminum as its main component and/or for the second material to contain copper as its main component.

The main component of a material is hereby that element whose proportion by weight in the relevant material is greatest.

The first material section 156 and the second material section 158 of the starting material 155 are preferably connected to each other by a substance-to-substance bond, for example by cold-rolling plating.

Likewise, the third material section 160 and the second material section 158 of the starting material 155 are preferably connected to each other by a substance-to-substance bond, for example by cold-rolling plating.

FIG. 6 shows how the cell connectors 142 and power connections 144 are separated out of the hybrid starting material 155 in the same relative positions which these elements adopt in the cell contacting system 140 mounted on the electrochemical device 100.

The cell connectors 142 and power connections 144 are first held in these relative positions by means of connecting elements (not depicted), in particular in the form of connecting webs, which connect the cell connectors 142 and the power connections 144 to each other as one piece and together with the same are separated out of the starting material 155.

The connecting elements are preferably separated off of the cell connectors 142 and the power connections 144, for example by punching out, after arranging the cell connectors 142 and the power connections 144 on a support element (not depicted) and are removed from the cell contacting system 140 in order to produce the necessary electrical insulation between the cell connectors 142 and power connections 144.

Thereafter, the conductor grouping depicted in FIG. 6 is arranged on the cell terminals 120, 122 of the electrochemical cells 104 upon the assembly of the electrochemical device 100.

Alternatively hereto, provision may also be made for the conductor grouping to be introduced into a separating tool (not depicted) after being separated out of the starting material 155, in which separating tool the connecting elements are separated off of the cell connectors 142 and the power connections 144, for example by punching out, wherein the cell connectors 142 and the power connections 144 are then moved from the separating tool to the cell terminals 120, 122 of the electrochemical device 100 by means of a gripping device (not depicted), for example by means of a multiple-gripper.

Then, in both cases, the cell connectors 142 and power connections 144 are electrically conductively contacted with the respectively associated cell terminals 120, 122 of the electrochemical cells 104, preferably by material bond, in particular by welding, for example by laser welding, ultrasonic welding, or friction stir welding.

The mounting of the cell contacting system 140 on the electrochemical device 100 is thus complete.

A second embodiment of the cell contacting system 140 depicted in FIGS. 7 and 8 differs from the first embodiment depicted in FIGS. 3 to 6 in that the cell connectors 142' and at least one of the power connections 144 cross the degassing region 134 of the electrochemical device 100 and preferably in each case at least one degassing outlet 130 of an electrochemical cell 104, and are each provided with a gas guidance channel section 162 in this crossing region.

Each gas guidance channel section 162 may be formed by a recess or indentation 164 by means of which the distance of the relevant cell connector 142 or power connection 144 from the terminal side face 124 of the respectively crossed electrochemical cell 104 increases in the region of the gas guidance channel section 162, such that an additional volume is created through which, as the case may be, gas escaping out of the degassing valves 132 is able to discharge.

The mutually aligned gas guidance channel sections 162 of the cell connectors 142' and the power connections 144 together form a gas guidance channel 166 which extends along the longitudinal direction 114 and which extends to at least one face side of the electrochemical device 100, such that, as the case may be, gas escaping out of the degassing valves 132 is able to discharge out of the electrochemical device 100 across the relevant face side.

Due to the interspaces between mutually adjacent cell connectors 142 and power connections 144, which interspaces are necessary for the electrical insulation, said gas guidance channel 166 is not entirely closed, but rather has gaps through which gas is able to escape out of the gas guidance channel 166 between two cell connectors 142, between two power connections 144, or between a cell connector 142 and a power connection 144.

In all other respects, the second embodiment of the cell contacting system 140 depicted in FIGS. 7 and 8 corresponds with respect to structure, function, and production method with the embodiment depicted in FIGS. 1 to 6, to the preceding description of which reference is made in this regard.

A third embodiment of the cell contacting system 140 depicted in FIGS. 9 and 10 differs from the second embodiment depicted in FIGS. 7 and 8 in that the cell contacting system 140 comprises a support element 168, for example in the form of a support plate 170, on which the cell connectors 142 and power connections 144 of the cell contacting system 140 are arranged.

The cell connectors 142 and/or the power connections 144 may hereby be secured on the support element 168, for example, by interference fit, by latching, by caulking, by adhesion, or in another manner by material bond, positive fit, or non-positive fit, in order to be able to be handled together with the support element 168 as one unit.

The support element 168 is formed of an electrically insulating material in order to maintain the electrical insulation between the cell connectors 142 and the power connections 144 of the cell contacting system 140.

The support element 168 preferably comprises an electrically non-conductive plastics material, for example PBT (polybutylenterephthalate), PP (polypropylene), PA (polyamide), ABS (acrylonitrile butadiene styrene), and/or LCP (liquid crystal polymer), and is preferably formed substantially entirely of such a plastics material.

A particularly suitable material for the support element 168 is a polypropylene material reinforced with talcum (for example the material with the designation PP TV20). Due to the talcum reinforcement, this material has a particularly high dimensional stability.

As can be seen in FIGS. 9 and 10, formed on the support element 168 is preferably a gas guidance channel 166 which extends in particular in the longitudinal direction 114 to at least one face side of the electrochemical device 100, particularly preferably to both face sides of the electrochemical device 100.

The gas guidance channel 166 may, for example, be configured as a recess or as an indentation 172 in the support element 168.

The gas guidance channel 166 formed on the support element 168 preferably crosses all degassing outlets 130 of the electrochemical cells 104 of the electrochemical device 100, such that, as the case may be, gas escaping out of the degassing valves 132 is able to discharge out of the electrochemical device 100 through the gas guidance channel 166 of the support element 168 via at least one face side of the electrochemical device 100.

The gas guidance channel 166 formed on the support element 168 hereby extends without interruption between both its ends adjacent to the face sides of the electrochemical device 100, such that no gas is able to escape out of the gas guidance channel 166 between the ends of the same.

The cell connectors 142 and power connections 144 of the cell contacting system 140 in the regions thereof adjoining the gas guidance channel 166 of the support element 168 are each provided with a recess or indentation 164 adapted to the cross section of the gas guidance channel 166, in order to be able to place the relevant cell connector 142 and the relevant power connection 144, respectively, on the support element 168.

In all other respects, the third embodiment depicted in FIGS. 9 and 10 of the cell contacting system 140 corresponds with respect to structure, function, and production method with the second embodiment depicted in FIGS. 7 and 8, to the preceding description of which reference is made in this regard.

A fourth embodiment depicted in FIG. 11 of the cell contacting system 140 differs from the first embodiment depicted in FIGS. 3 to 6 in that the cell connectors 142 and power connections 144 of the cell contacting system 140 each have in the contact regions 148, 150 thereof one or a plurality of recesses 174 which in particular each have the form of a gap or a slit 176 and each separate two sections 178 of the relevant contact region 148, 150 from each other, which are provided for contacting different cell terminals 120, 122 of the same cell group 102.

As a result, said sections 178 of the contact regions 148, 150 are mechanically decoupled from each other, such that a movement of these sections 178 of the contact regions 148, 150, which are associated with different electrochemical cells 104, relative to each other in the operation of the electrochemical device 100 and/or for tolerance compensation upon the mounting of the cell contacting system 140 is made possible.

In all other respects, the fourth embodiment of the cell contacting system 140 depicted in FIG. 11 corresponds with respect to structure, function, and production method with the first embodiment depicted in FIGS. 1 to 6, to the preceding description of which reference is made in this regard.

A fifth embodiment of the cell contacting system 140 depicted in FIGS. 12 and 13 differs from the first embodiment depicted in FIGS. 1 to 6 in that the cell connectors 142 and power connections 144 each have in the contact regions 148 thereof a plurality of elastically and/or plastically deformable compensation sections 180, wherein each of these compensation sections 180 connects in each case two sections 178 of the respective contact region 148, 150 to each other, which are provided for contacting different cell terminals 120, 122 of the same cell group 102.

For this purpose, the compensation section 180 may in particular have one or a plurality of compensation shafts 182 running transversely, preferably substantially perpendicularly, to the longitudinal direction 114 of the electrochemical device 100.

Alternatively or in addition hereto, each compensation section 180 may have a cross section—taken along the longitudinal direction 114—which contains at least a U-shape, S-shape, Ω-shape, and/or meandering shape.

As a result of such a compensation section 180, a relative movement of the two sections 178 of a contact region 148, 150 connected to each other by the respective compensation section 180 is made possible in the operation of the electrochemical device 100 and/or for tolerance compensation upon the mounting of the cell contacting system 140.

In this embodiment of the cell contacting system 140, preferably only one of the sections 178 of a contact region 148, 150 which is associated with one of the cell terminals 120, 122 to be contacted is connected to the intermediate region 152 of the respective cell connector 142, wherein the intermediate region 152 is formed correspondingly narrower than in the first embodiment of the cell contacting system 140 depicted in FIGS. 1 to 6.

It is hereby achieved that a movement of the other sections 178 of the respective contact region 148, 150, which are not directly connected to the intermediate region 152, relative to the one section 178, which is directly connected to the intermediate region 152, is not hindered.

In all other respects, the fifth embodiment of the cell contacting system 140 depicted in FIGS. 12 and 13 corresponds with respect to structure, function, and production method with the first embodiment depicted in FIGS. 1 to 6, to the preceding description of which reference is made in this regard.

A second embodiment of the electrochemical device 100 depicted in FIGS. 14 and 15 differs from the first embodiment depicted in FIGS. 1 and 2 in that the polarities of the first terminals 120 of the electrochemical cells 104, which terminals are arranged in the first cell terminal region 126 of the electrochemical device 100, do not alternate, but rather coincide with each other.

In particular, all first cell terminals 120 of the cell groups 102 may thus have a negative polarity, for example.

Thus, in this embodiment of the electrochemical device 100, all second cell terminals 122 of the electrochemical cells 104, which are arranged in the second cell terminal region 128 of the electrochemical device 100, also have the same polarity.

In particular, the second cell terminals 122 of the cell groups 102 may thus have a positive polarity, for example.

In all other respects, the embodiment of the electrochemical device 100 depicted in FIGS. 14 and 15 corresponds with respect to structure, function, and production method with the first embodiment depicted in FIGS. 1 and 2, to the preceding description of which reference is made in this regard.

A sixth embodiment of the cell contacting system 140 depicted in FIGS. 16 and 19 also serves for contacting the cell terminals 120, 122 of the electrochemical calls 104 in a series connection in the second embodiment of the electrochemical device depicted in FIGS. 14 and 15.

As can be seen best in FIG. 17, in which the cell connectors 142 and the power connections 144 of the cell contacting system 140 are depicted transparently so that the polarities of the cell terminals 120, 122 arranged thereunder may be recognized, in embodiment of the cell contacting system 140 depicted here, a 6s3p connection of the six cell groups 102 of in each case three electrochemical cells 104 is produced as follows:

The negative power connection 144a is connected to the negative first cell terminals 120 of the second cell group 102$^2$. The positive second cell terminals 122 of the second cell group 102$^2$ are connected to the negative first cell terminals 120 of the fourth cell group 102$^4$ by means of the first cell connector 142'. The second cell connector 142$^2$ connects the positive second cell terminals 122 of the fourth cell group 102$^4$ to the negative first cell terminals 120 of the sixth cell group 102$^6$. The third cell connector 142$^3$ connects the positive second cell terminals 122 of the sixth cell group 102$^6$ to the negative first cell terminals 120 of the fifth cell group 102$^5$. The fourth cell connector 142$^4$ connects the positive second cell terminals 122 of the fifth cell group 102$^5$ to the negative first cell terminals 120 of the third cell group 102$^3$. The fifth cell connector 142$^5$ connects the positive second cell terminals 122 of the third cell group 102$^3$ to the negative first cell terminals 120 of the first cell group 102$^1$. The positive power connection 144b is connected to the positive second cell terminals 122 of the first cell group 102$^1$.

In this embodiment of the cell contacting system 140, the cell connector 142$^3$ thus extends from cell terminals of the sixth cell group 102$^6$, obliquely to the longitudinal direction 114 of the electrochemical device 100, to cell terminals of fifth cell group 102$^5$ directly adjacent to the sixth cell group 102$^6$.

Further, this embodiment of the cell contacting system 140 comprises a plurality of cell connectors 142 which cross each other—when examined along a viewing direction 154 aligned perpendicularly to the contact plane 138 of the electrochemical device 100.

The first cell connector 142$^1$ thus crosses with the fourth cell connector 142$^4$ and with the fifth cell connector 142$^5$. The second cell connector 142$^2$ crosses with the third cell connector 142$^3$ and with the fourth cell connector 142$^4$. The third cell connector 142$^3$ crosses with the third cell connector 142$^2$. The fourth cell connector 142$^4$ crosses with the first cell connector 142$^1$ and with the second cell connector 142$^2$. The fifth cell connector 142$^5$ crosses with the first cell connector 142$^1$ and with the negative power connection 144a.

Due to these crossings, the intermediate regions 152 of the mutually crossing cell connectors 142 and power connections 144, respectively, must run at different height levels, that is, at different distances from the contact plane 138 of the electrochemical device 100, as can be seen in FIG. 19, in which the intermediate region 152 of the second cell connector 142$^2$ runs at a greater distance from the contact plane 138 than the third cell connector 142$^3$ and the fourth cell connector 142$^4$.

The required different distances from the contact plane 138 of the electrochemical device 100 may in particular be produced by the cell connectors 142 or the power connections 144, which run in sections at a greater distance from the contact plane 138, are provided with beads or angular bends 184—running preferably substantially in parallel to the longitudinal direction 114 of the electrochemical device 100.

In all other respects, the sixth embodiment of the cell contacting system 140 depicted in FIGS. 17 to 19 corresponds with respect to structure, function, and production method with the first embodiment depicted in FIGS. 1 to 6, to the preceding description of which reference is made in this regard.

However, the sixth embodiment of the cell contacting system 140 cannot be separated out of a sheet-like starting material as a conductor grouping due to the crossings between the cell connectors 142 and the power connections 144.

A seventh embodiment of the cell contacting system 140 depicted in FIGS. 20 and 21 differs from the sixth embodiment depicted in FIGS. 16 to 19 in that an electrically insulating insulation element 186, preferably in the form of a substantially planar insulation plate 188, is arranged between the mutually crossing cell connectors 142 and power connections 144.

It is hereby prevented that a short circuit between the mutually crossing elements of the cell contacting system 140 occur as a result of relative movements between the mutually crossing cell connectors 142 and/or power connections 144 in the operation of the electrochemical device 100, for example due to vibrations or impacts that act on a motor vehicle in which the electrochemical device 100 is arranged.

The insulation element 186 may, for example, comprise an electrically non-conductive plastics material and in particular be formed substantially entirely of such an electrically non-conductive plastics material.

In all other respects, the seventh embodiment of the cell contacting system 140 depicted in FIGS. 20 and 21 corresponds with respect to structure, function, and production method with the sixth embodiment depicted in FIGS. 16 to 19, to the preceding description of which reference is made in this regard.

An eighth embodiment of the cell contacting system 140, depicted in FIGS. 22 and 23, also serves for producing a series connection of the cell groups 102 of the second embodiment of the electrochemical device 100, depicted in FIGS. 14 and 15.

This eighth embodiment of the cell contacting system 140 differs from the sixth embodiment depicted in FIGS. 16 to 19 in that the cell connectors 142 of the cell contacting system 140 do not overlap each other, but rather only one of the power connections 144 crosses over the cell connectors 142 in order to achieve that both power connections 144*a*, 144*b* are arranged on the same face side of the electrochemical device 100.

As can be seen best in FIG. 23, in which the cell connectors 142 and the power connections 144 of the cell contacting system 140 are depicted transparently so that the polarity of the cell terminals 120, 122, arranged thereunder, of the electrochemical cells 104 may be recognized, in this embodiment of the cell contacting system 140 a 6s3p series connection of the six cell groups 102 of in each case three electrochemical cells 104 is produced as follows:

The negative power connection 144*a* is connected to the negative first cell terminals 120 of the sixth cell group 102$^6$. The fifth cell connector 142$^5$ connects the positive second cell terminals 122 of the sixth cell group 102$^6$ to the negative first cell terminals 120 of the fifth cell group 102$^5$. The fourth cell connector 142$^4$ connects the positive second cell terminals 122 of the fifth cell group 102$^5$ to the negative first cell terminals 120 of the fourth cell group 102$^4$. The third cell connector 142$^3$ connects the positive second cell terminals 122 of the fourth cell group 102$^4$ to the negative first cell terminals 120 of the third cell group 102$^3$. The second cell connector 142$^2$ connects the positive second cell terminals 122 of the third cell group 102$^3$ to the negative first cell terminals 120 of second cell group 102$^2$. The first cell connector 142' connects the positive second cell terminals 122 of the second cell group 102$^2$ to the negative first cell terminals of the first cell group 102'. The positive power connection 144*b* is connected to the positive second cell terminals 122 of the first cell group 102'.

In this embodiment of the cell contacting system 140, one of the power connections 144, for example the negative power connection 144*a*, comprises a crossing section 190 which preferably extends in the longitudinal direction 114 of the electrochemical device 100 at a greater distance from the contact plane 138 of the electrochemical device 100 across the cell connectors 142 extending obliquely to the longitudinal direction 114.

Alternatively hereto, provision may also be made for the crossing section 190 of the power connection 144*a* to extend through under the cell connectors 142 at a lesser distance from the contact plane 138.

The greater distance of the crossing section 190 from the contact plane 138 is achieved, for example, in that the power connection 144*a* is provided with a bead or an angular bend 184, which preferably runs substantially parallel to the longitudinal direction 114.

In order to ensure that the crossing section 190 of the power connection 144*a* runs at a lesser distance from the contact plane 138 than the intermediate regions 152 of the cell connectors 142, provision may be made for the distance of the intermediate regions 152 from the contact plane 138 to be increased by beads or angular bends, which preferably run substantially in parallel to the longitudinal direction 114 of the electrochemical device 100.

In this embodiment of the cell contacting system 140, all cell connectors 142 each extend from the cell terminals 120, 122 of a cell group 102 to cell terminals 122, 120 of a further cell group directly adjacent to the prior cell group 102.

In all other respects, the eighth embodiment of the cell contacting system 140 depicted in FIGS. 22 and 23 corresponds with respect to structure, function, and production method with the sixth embodiment depicted in FIGS. 16 to 19, to the preceding description of which reference is made in this regard.

Figure 25:
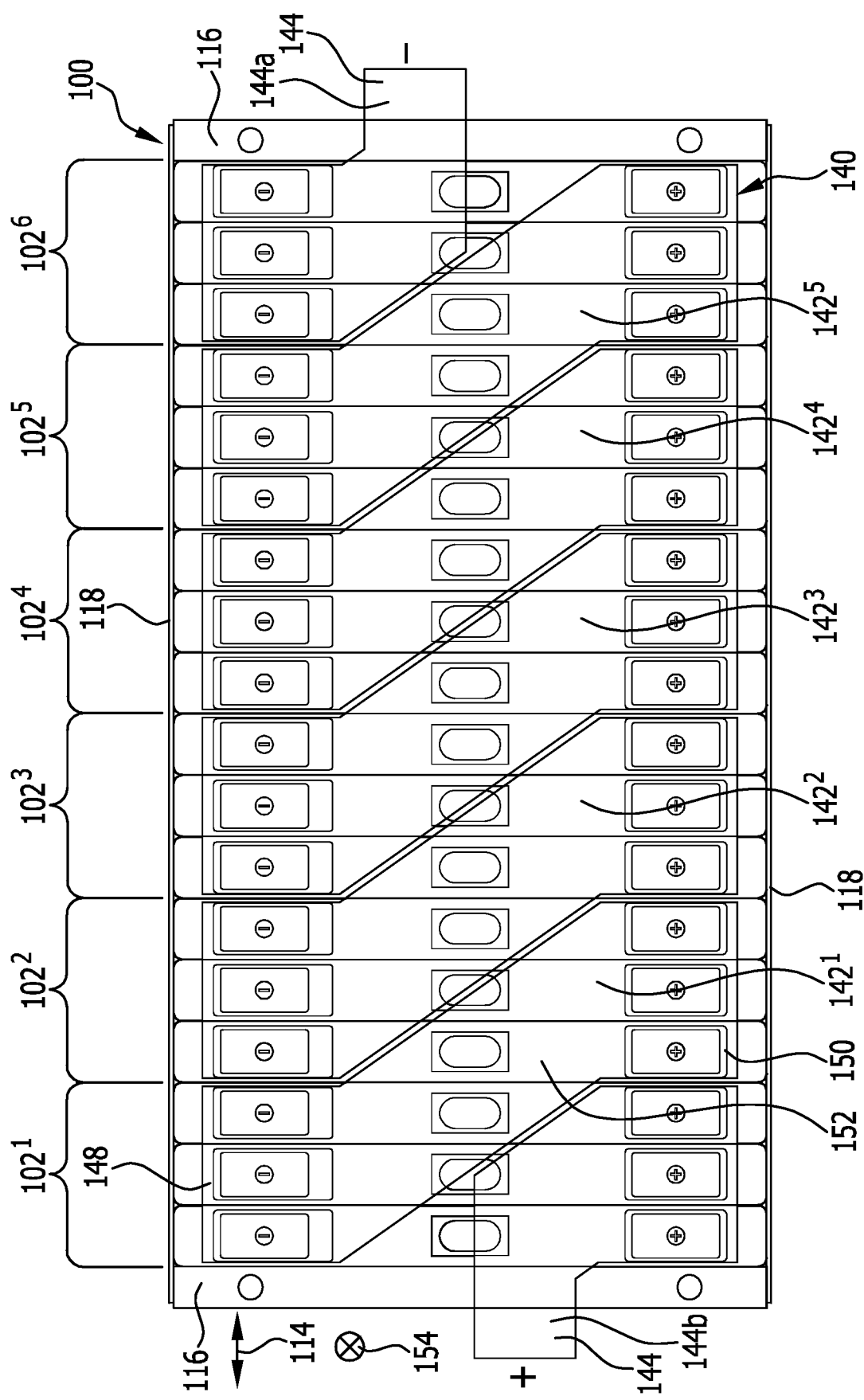
FIG. 25 shows a view, corresponding to FIG. 24, of the electrochemical device and of the cell contacting system, wherein the cell connectors and power connections of the cell contacting system are depicted transparently, so that the polarity of the cell terminals contacted by means of the cell connectors and the power connections, respectively, are able to be recognized.

A ninth embodiment of the cell contacting system 140 depicted in FIGS. 24 and 25 differs from the eighth embodiment depicted in FIGS. 22 and 23 in that the power connection 144*a* does not cross with the cell connectors 142 of the cell contacting system 140, but rather ends on a face side of the electrochemical device 100 that is opposite the face side of the electrochemical device 100 on which the other power connection 144*b* ends.

Because in this embodiment no cell connector 142 and no power connection 144 overlap another element of the cell contacting system 140, it is possible to separate said cell contacting system 140 out of a sheet-like starting material 155 in the form of a conductor grouping of cell connectors 142 and power connections 144 (with connecting elements connecting the same), as is depicted in FIGS. 5 and 6 in conjunction with the first embodiment of the cell contacting system 140.

For this, however, conductors for connecting the electrochemical device 100 to an external power source and to an external consumer, respectively, must be brought up to the electrochemical device 100 from two opposing sides.

In all other respects, the ninth embodiment depicted in FIGS. 24 and 25 of the cell contacting system 140 corresponds with respect to structure, function, and production method with the eighth embodiment depicted in FIGS. 22 and 23, to the preceding description of which reference is made in this regard.

A tenth embodiment of the cell contacting system 140 depicted in FIGS. 26 and 27 differs from the fifth embodiment depicted in FIGS. 12 and 13 in that the cell connectors 142 each have not only in the contact regions 148, 150 thereof a plurality of elastically and/or plastically deformable compensation sections 180 which enable a relative movement between in each case two sections 178 of the respective contact region 148, 150, that are provided for contacting different cell terminals 120, 122 of the same cell group 102, but also provided in the intermediate regions 152 of the cell connectors 142' is in each case one compensation section 180' which enables a relative movement between the first contact region 148 and the second contact region 150 of the respective cell connector 142'.

For this purpose, the compensation section 180' may in particular have one or a plurality of compensation shafts 182' running transversely, preferably substantially perpendicularly, to the longitudinal direction 114 of the electrochemical device 100.

Alternatively or in addition hereto, each compensation section 180' may have a cross section—taken along the longitudinal direction 114—which contains at least a U-shape, S-shape, Ω-shape, and/or meandering shape.

As a result of such a compensation section 180', it is possible to move the first contact region 148 and the second contact region 150 of the respective cell connector 142' relative to each other in the operation of the electrochemical device 100 and/or for tolerance compensation upon the mounting of the cell contacting system 140.

In this embodiment of the cell contacting system 140, the intermediate regions 152 of the cell connectors 142' may be formed exactly as wide as in the first embodiment of the cell contacting system 140 depicted in FIGS. 1 to 6.

The compensation sections 180 which each connect two sections 178 of a contact region 148, 150 to each other, that are provided for contacting different cell terminals 120, 122 of the same cell group 102, hereby preferably extend from a lateral edge 192 of the respectively associated contact region 148, 150, which preferably extends substantially in parallel to the longitudinal direction 114, to a lateral edge 194 of the intermediate region 152 which preferably runs obliquely to the longitudinal direction 114.

In all other respects, the tenth embodiment depicted in FIGS. 26 and 27 of the cell contacting system 140 corresponds with respect to structure, function, and production method with the fifth embodiment depicted in FIGS. 12 and 13, to the preceding description of which reference is made in this regard.

The invention claimed is:

1. A cell contacting system for an electrochemical device which comprises a plurality of cell groups that each comprise one or a plurality of electrochemical cells,
   wherein each electrochemical cell has a first cell terminal and a second cell terminal, said first cell terminal and said second cell terminal ending on substantially planar contact surfaces lying in a contact plane of the electrochemical device,
   wherein the electrochemical cells follow each other along a longitudinal direction of the electrochemical device,
   the first cell terminals of the electrochemical cells follow each other along the longitudinal direction in a first cell terminal region of the electrochemical device, and
   the second cell terminals of the electrochemical cells follow each other along the longitudinal direction in a second cell terminal region of the electrochemical device,
   wherein the cell contacting system comprises at least one cell connector for electrically conductively connecting at least one cell terminal of a first cell group to at least one cell terminal of a second cell group,
   wherein the cell connector comprises a first contact region for contacting the at least one cell terminal of the first cell group and a second contact region for contacting the at least one cell terminal of the second cell group,
   wherein at least one cell connector extends obliquely to the longitudinal direction from at least one cell terminal of the first cell group in the first cell terminal region to at least one cell terminal of the second cell group in the second cell terminal region,
   wherein the at least one cell connector comprises an intermediate region connecting the first contact region and the second contact region to each other, the longitudinal axis of which intermediate region is aligned obliquely to the longitudinal direction of the electrochemical device, and
   wherein the at least one cell connector is provided with beads or angular bends running in parallel to the longitudinal direction of the electrochemical device and obliquely to the longitudinal axis of the intermediate region,
   said beads or angular bends being configured such that the intermediate region of the at least one cell connector runs at a distance from the contact plane of the electrochemical device which is different from the distances from the contact plane of the electrochemical device at which the first contact region and the second contact region runs, respectively.

2. The cell contacting system in accordance with claim 1, wherein the second cell group is arranged directly adjacent to the first cell group.

3. The cell contacting system in accordance with claim 1, wherein the second cell group is arranged not directly adjacent to the first cell group.

4. The cell contacting system in accordance with claim 3, wherein the at least one cell connector extends across a cell group of the electrochemical device arranged between the first cell group and the second cell group.

5. The cell contacting system in accordance with claim 1, wherein the electrochemical cells of the electrochemical device are arranged between two face sides of the electrochemical device, which are aligned transversely to the longitudinal direction of the electrochemical device and are spaced apart from each other in the longitudinal direction of the electrochemical device, wherein the cell contacting system has two power connections of different polarity.

6. The cell contacting system in accordance with claim 5, wherein the two power connections end on the same face side of the electrochemical device.

7. The cell contacting system in accordance with claim 5, wherein the two power connections end on different face sides of the electrochemical device.

8. The cell contacting system in accordance with claim 1, wherein the cell contacting system comprises a plurality of cell connectors which do not overlap.

9. The cell contacting system in accordance with claim 1, wherein the cell contacting system comprises at least two cell connectors which cross over each other.

10. The cell contacting system in accordance with claim 9, wherein at least one electrically insulating insulation element is arranged between at least two cell connectors which cross over each other.

11. The cell contacting system in accordance with claim 1, wherein at least one cell connector, in the mounted state of the cell contacting system, crosses at least one degassing outlet of an electrochemical cell and is provided with a gas guidance channel section in the crossing region.

12. The cell contacting system in accordance with claim 1, wherein the cell contacting system comprises a support element on which a plurality of cell connectors of the cell contacting system are arranged, wherein the support element, in the mounted state of the cell contacting system, crosses at least one degassing outlet of an electrochemical cell and is provided with a gas guidance channel in the crossing region.

13. The cell contacting system in accordance with claim 1, wherein at least one cell connector has in at least one of its contact regions at least one recess which separates two sections of the contact region from each other, that are provided for contacting different cell terminals of the same cell group.

14. The cell contacting system in accordance with claim 1, wherein at least one cell connector has in at least one of its contact regions at least one elastically and/or plastically deformable compensation section which connects two sections of the contact region to each other, that are provided for contacting different cell terminals of the same cell group.

15. The cell contacting system in accordance with claim 1, wherein at least one cell connector of the cell contacting system has been separated out of a sheet-like starting material which comprises a first material section of a first material for forming at least one contact region of the cell connector and at least one second material section of a second material for forming an intermediate region of the cell connector that connects the contact regions of the cell connector to each other.

16. The cell contacting system in accordance with claim 15, wherein a plurality of cell connectors of the cell contacting system have been separated together out of the sheet-like starting material.

17. The cell contacting system in accordance with claim 15, wherein the first material contains aluminum as its main component and/or the second material contains copper as its main component.

18. The cell contacting system in accordance with claim 15, wherein the first material section and the second material section of the starting material are connected to each other by a substance-to-substance bond.

* * * * *